(12) United States Patent
Hotte

(10) Patent No.: US 9,120,188 B2
(45) Date of Patent: Sep. 1, 2015

(54) APPARATUS AND METHOD FOR INSERTING A COMPONENT THROUGH THE SURFACE OF A WORKPIECE

(75) Inventor: Denis Hotte, Québec (CA)

(73) Assignee: CENTRE DE RECHERCHE INDUSTRIELLE DU QUEBEC, Quebec (CA)

( * ) Notice: Subject to any disclaimer, the term of this patent is extended or adjusted under 35 U.S.C. 154(b) by 314 days.

(21) Appl. No.: 13/988,806

(22) PCT Filed: Nov. 23, 2010

(86) PCT No.: PCT/CA2010/001888
§ 371 (c)(1),
(2), (4) Date: May 22, 2013

(87) PCT Pub. No.: WO2012/068663
PCT Pub. Date: May 31, 2012

(65) Prior Publication Data
US 2013/0239397 A1     Sep. 19, 2013

(51) Int. Cl.
    *B23K 20/12* (2006.01)
    *B23P 19/00* (2006.01)
    *B23P 23/00* (2006.01)
    *B21J 5/06* (2006.01)
    *B21J 15/02* (2006.01)
    (Continued)

(52) U.S. Cl.
    CPC ............ *B23P 19/00* (2013.01); *B21J 5/063* (2013.01); *B21J 15/027* (2013.01); *B21K 25/005* (2013.01); *B23B 51/101* (2013.01); *B23K 20/127* (2013.01); *B23P 23/00* (2013.01); *B23K 20/125* (2013.01); *B23K 20/1255* (2013.01); *Y10T 29/49945* (2015.01); *Y10T 29/53978* (2015.01)

(58) Field of Classification Search
    CPC .......... Y10T 29/49833; Y10T 29/49835; Y10T 29/49968; Y10T 29/49945; B23P 19/06; B23P 23/04; B23P 23/00; B21J 15/027; B23B 51/101; B23K 20/1255; B23K 20/1295; B23K 20/127; B23K 20/125
    See application file for complete search history.

(56) References Cited

U.S. PATENT DOCUMENTS 2,202,405 A   7/1936  Smith
4,477,307 A   10/1984 Cearlock
(Continued)

FOREIGN PATENT DOCUMENTS

JP      58090388 A   *  5/1983   ............. B23K 20/12
JP    2000094158 A   *  4/2000   ............. B23K 20/12
(Continued)

*Primary Examiner* — Jermie Cozart
(74) *Attorney, Agent, or Firm* — Jean-Claude Boudreau

(57) ABSTRACT

A rotary tool (11) for use with a rotary driving unit (12) for inserting a component (14,14',14") through a surface of a workpiece made of a material showing friction-induced plasticity such as aluminum, includes a tool body (22) having a working end (24) defining a shoulder portion (26) and a securing device (28,28') for selectively engaging the component to impart rotation thereof in a first direction while applying an axial force of a sufficient magnitude onto the component to produce insertion thereof by plasticizing the material through friction. The shoulder portion is provided with a deburring device (34) capable of being displaced from an inoperative position upon rotation of the tool body (22) in the first rotation direction (30), to an operative position whenever the tool body is caused to rotate in an opposite direction (30'), to provide deburring of the workpiece surface.

13 Claims, 22 Drawing Sheets

(51) Int. Cl.
*B21K 25/00* (2006.01)
*B23B 51/10* (2006.01)

(56) References Cited

U.S. PATENT DOCUMENTS

| | | | |
|---|---|---|---|
| 4,551,189 A | 11/1985 | Peterson | |
| 4,676,707 A | 6/1987 | Cearlock | |
| 4,832,549 A | 5/1989 | Shibayama | |
| 4,850,772 A | 7/1989 | Jenkins | |
| 4,915,558 A | 4/1990 | Muller | |
| 5,054,980 A | 10/1991 | Bidefeld | |
| 5,794,835 A | 8/1998 | Colligan | |
| 6,067,839 A | 5/2000 | Xie | |
| 6,227,433 B1 | 5/2001 | Waldron | |
| 6,311,889 B1 | 11/2001 | Ezumi | |
| 6,485,240 B2 | 11/2002 | Stumpf | |
| 6,640,414 B2 | 11/2003 | Stevenson et al. | |
| 6,676,007 B2 | 1/2004 | Stevenson | |
| 6,722,013 B1 | 4/2004 | Rapp | |
| 6,725,515 B2 | 4/2004 | Lotz | |
| 6,729,531 B2 | 5/2004 | Stevenson | |
| 6,769,595 B2 | 8/2004 | Stol | |
| 6,988,651 B2 | 1/2006 | Stevenson | |
| 7,367,487 B2 | 5/2008 | Murakawa | |
| 7,575,149 B2 | 8/2009 | De Traglia | |
| 7,695,227 B2 | 4/2010 | Stevenson | |
| 2001/0004989 A1 | 6/2001 | Ezumi et al. | |
| 2002/0158109 A1 | 10/2002 | Gendoh | |
| 2003/0098335 A1 | 5/2003 | Saeki | |
| 2003/0154585 A1 | 8/2003 | Lotz | |
| 2006/0213954 A1 | 9/2006 | Ruther | |
| 2007/0172335 A1 | 7/2007 | Christ | |
| 2007/0267462 A1* | 11/2007 | Burton et al. | 228/114.5 |
| 2007/0295781 A1* | 12/2007 | Hunt et al. | 228/2.1 |

FOREIGN PATENT DOCUMENTS

| | | | | |
|---|---|---|---|---|
| JP | 2000343244 A | * | 12/2000 | B23K 20/12 |
| JP | 2001300744 A | * | 10/2001 | B23K 20/12 |
| JP | 2002066760 A | * | 3/2002 | B23K 20/12 |
| JP | 2002224859 A | * | 8/2002 | B23K 20/12 |
| JP | 2003126973 A | * | 5/2003 | B23K 20/12 |
| JP | 2003334672 A | * | 11/2003 | B23K 20/12 |
| JP | 2004130367 A | * | 4/2004 | B23K 20/12 |
| JP | 2007054858 A | | 3/2007 | |
| JP | 2007061875 A | * | 3/2007 | |
| JP | 2007301579 A | * | 11/2007 | |
| JP | 2008254012 A | * | 10/2008 | |
| WO | 2005092558 A1 | | 10/2005 | |
| WO | WO 2005092558 A1 | * | 10/2005 | |

* cited by examiner

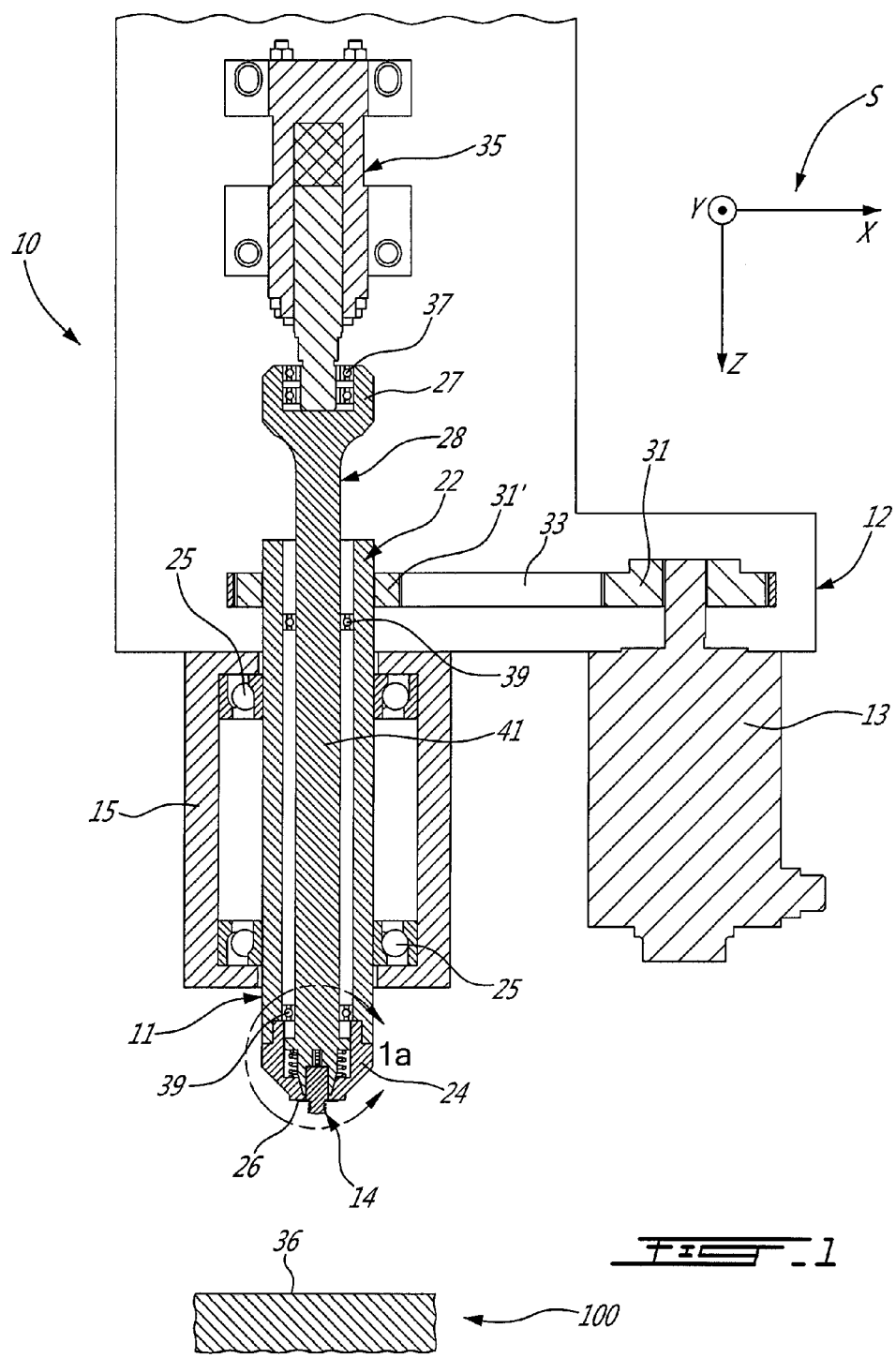

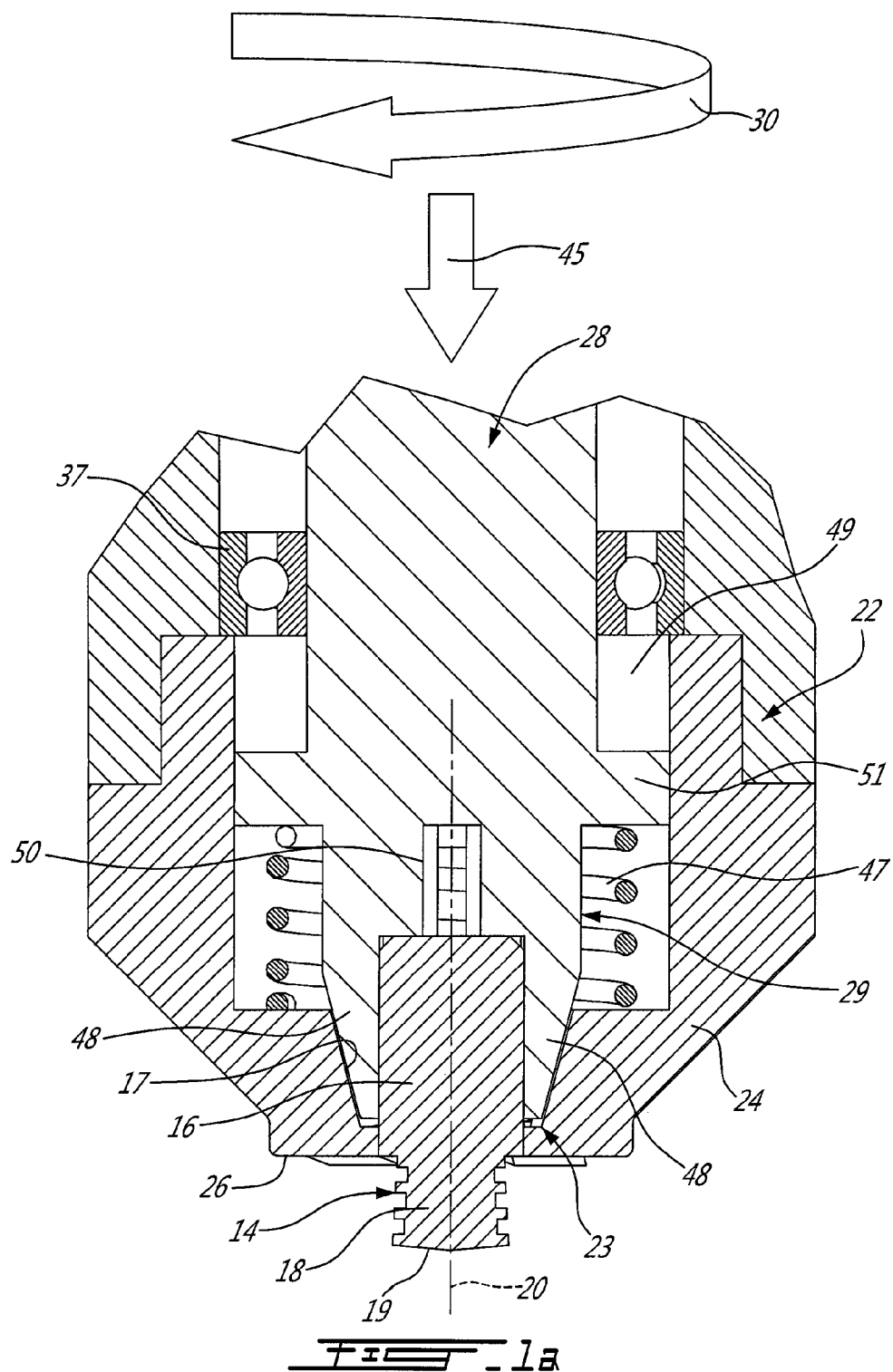

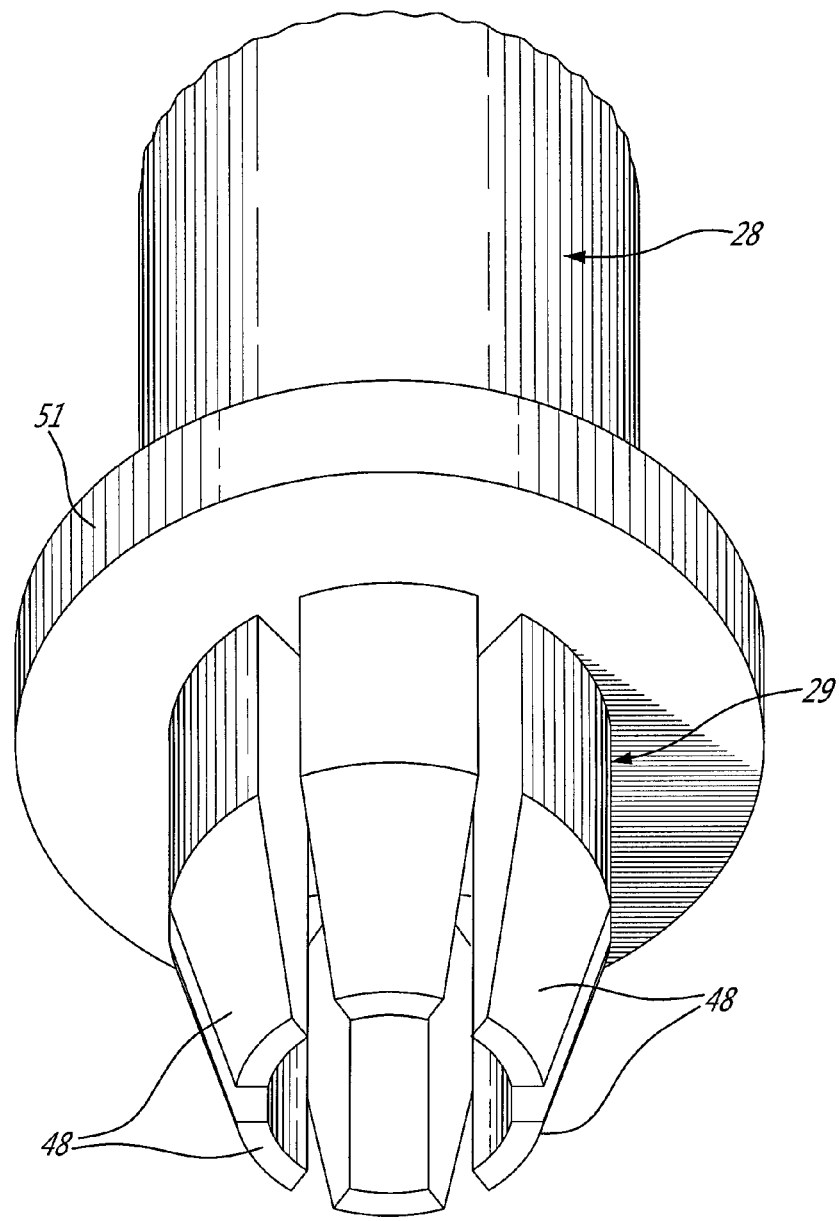

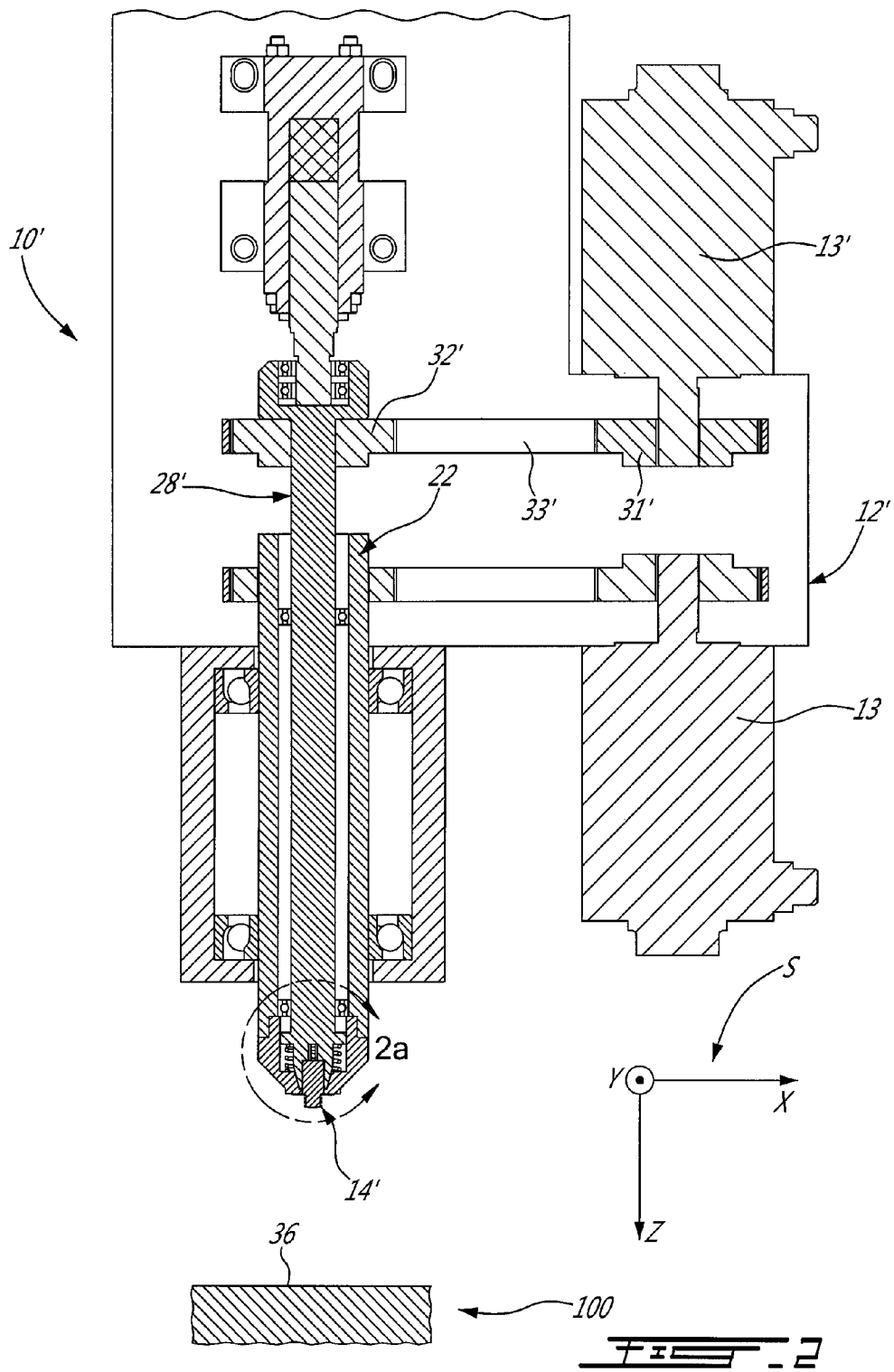

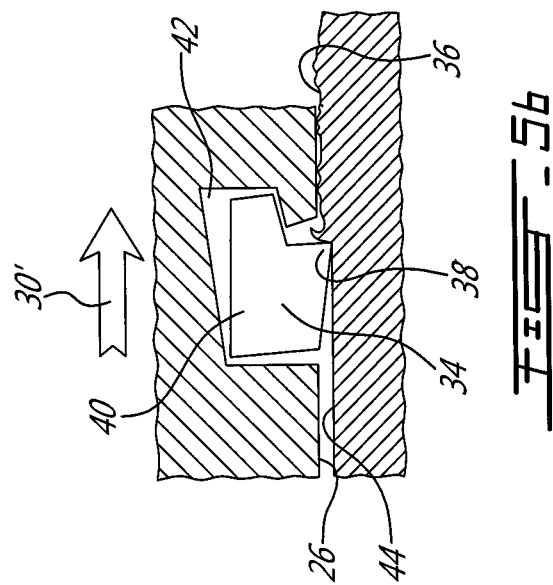
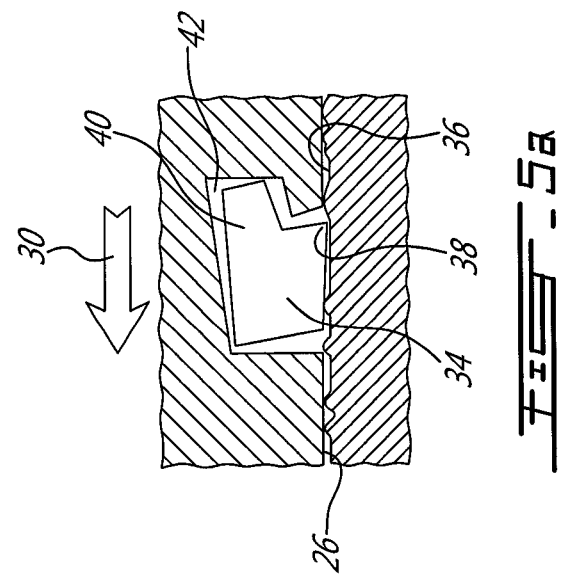

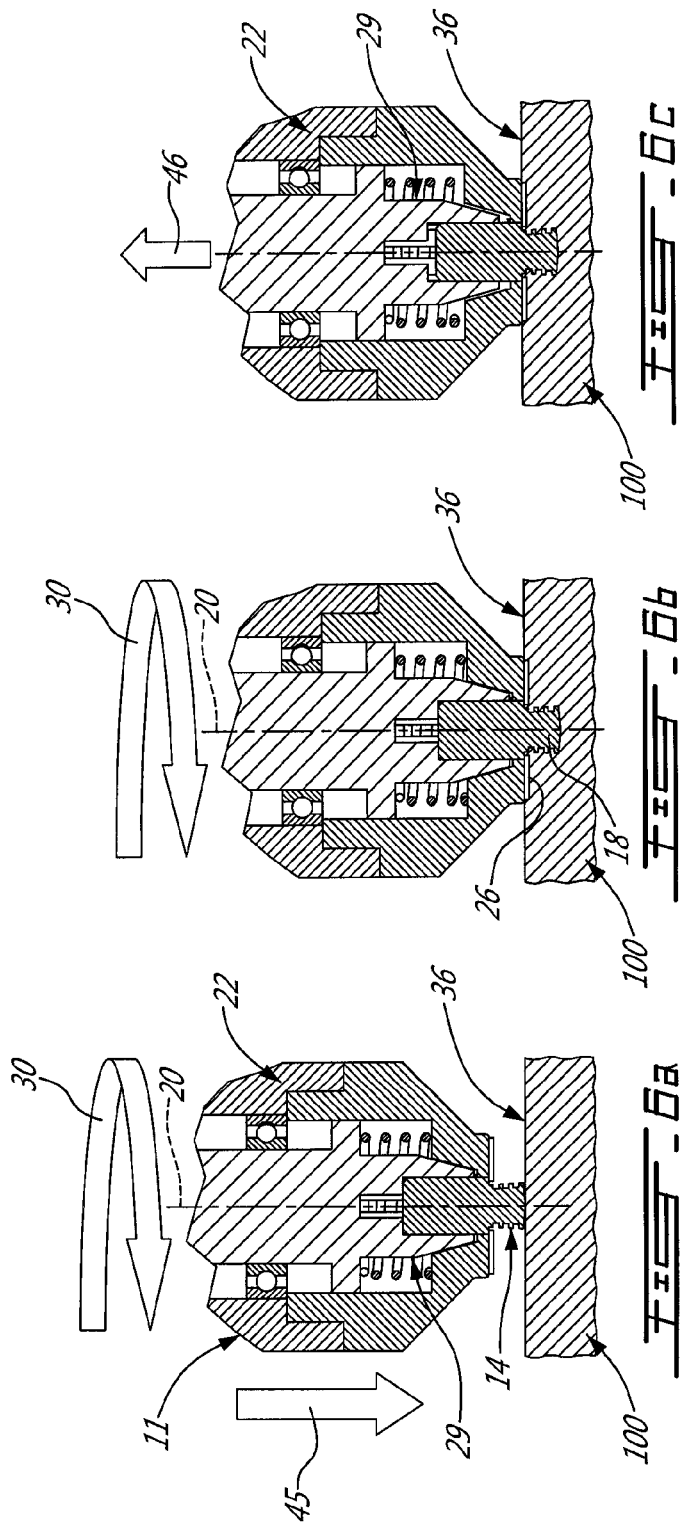

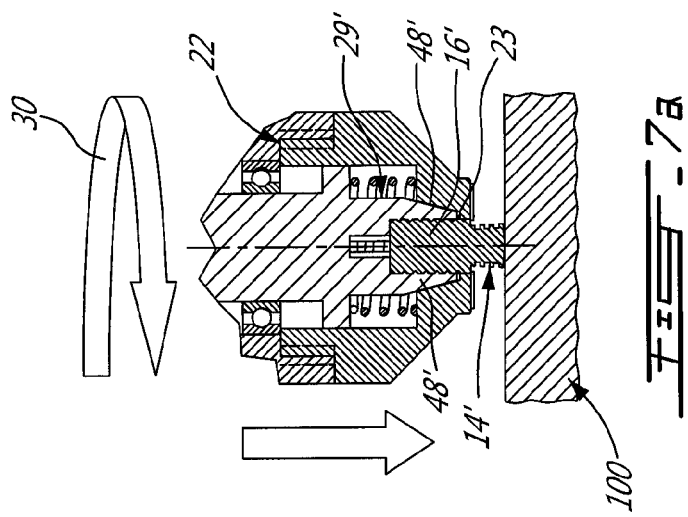
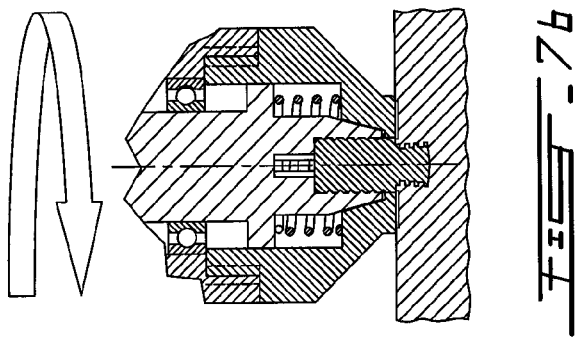
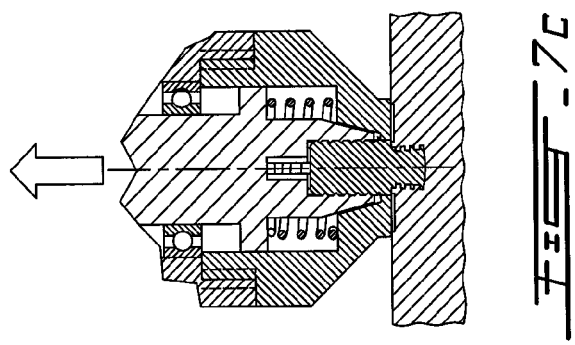

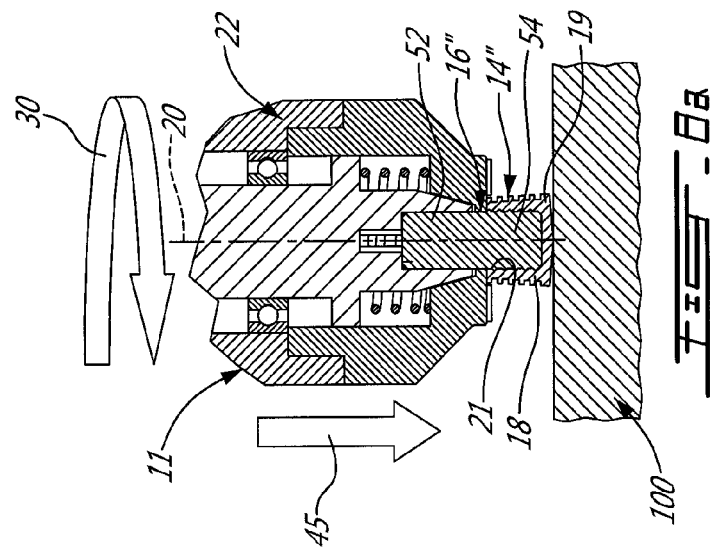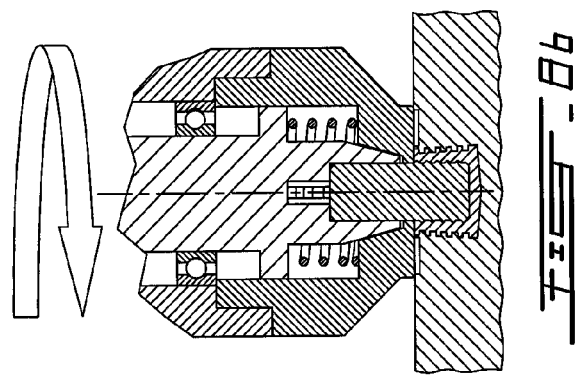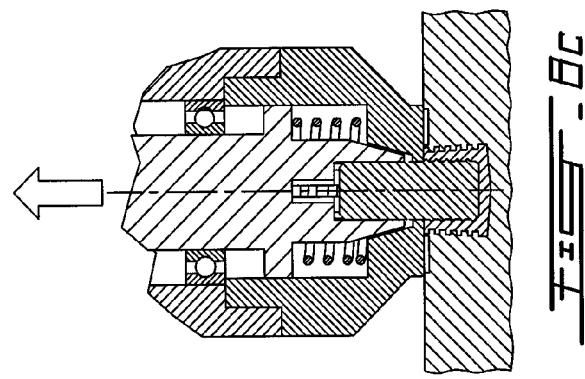

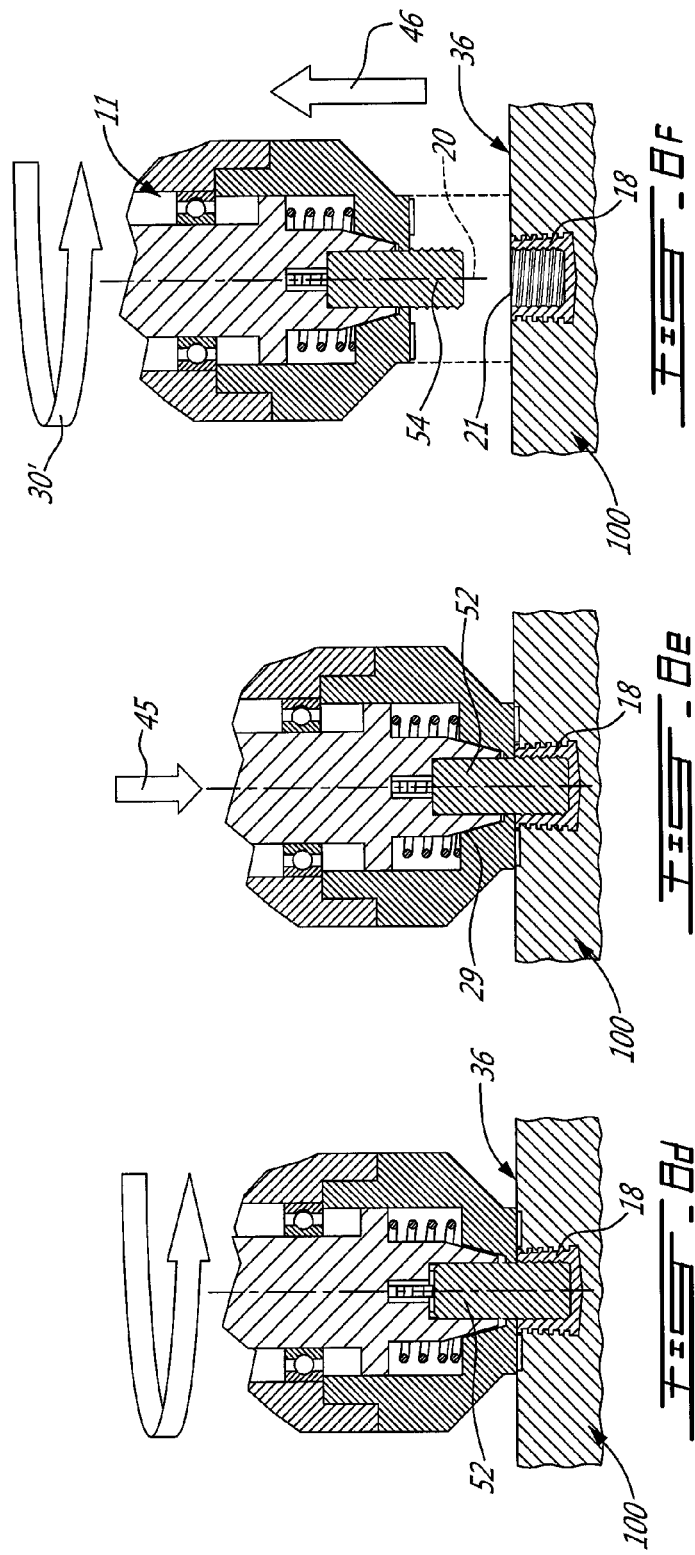

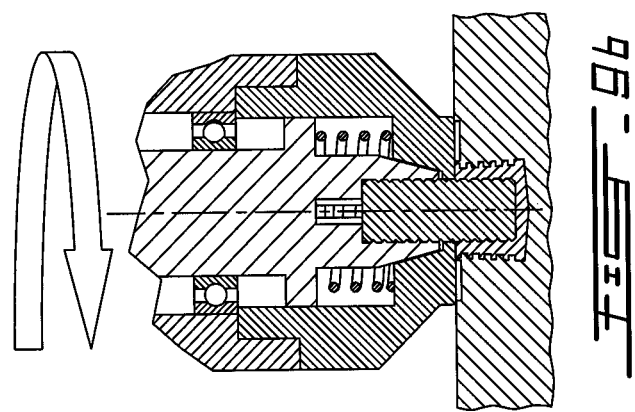
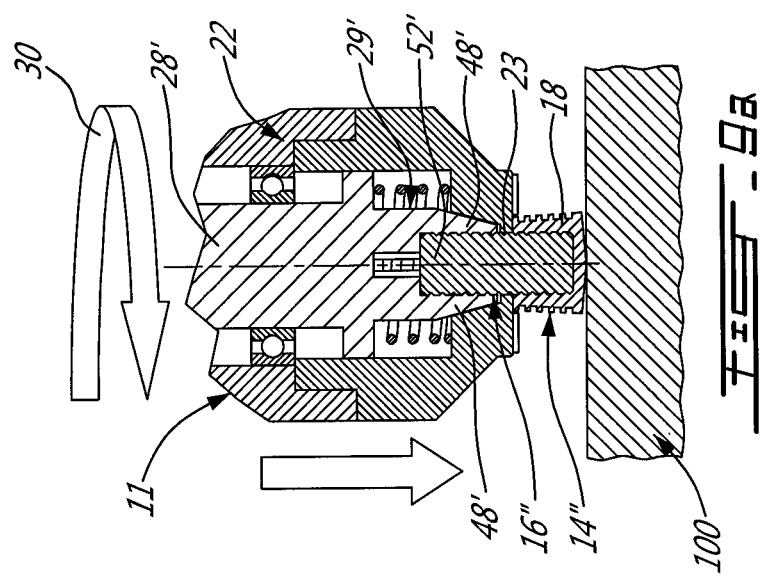
FIG-9a
FIG-9b

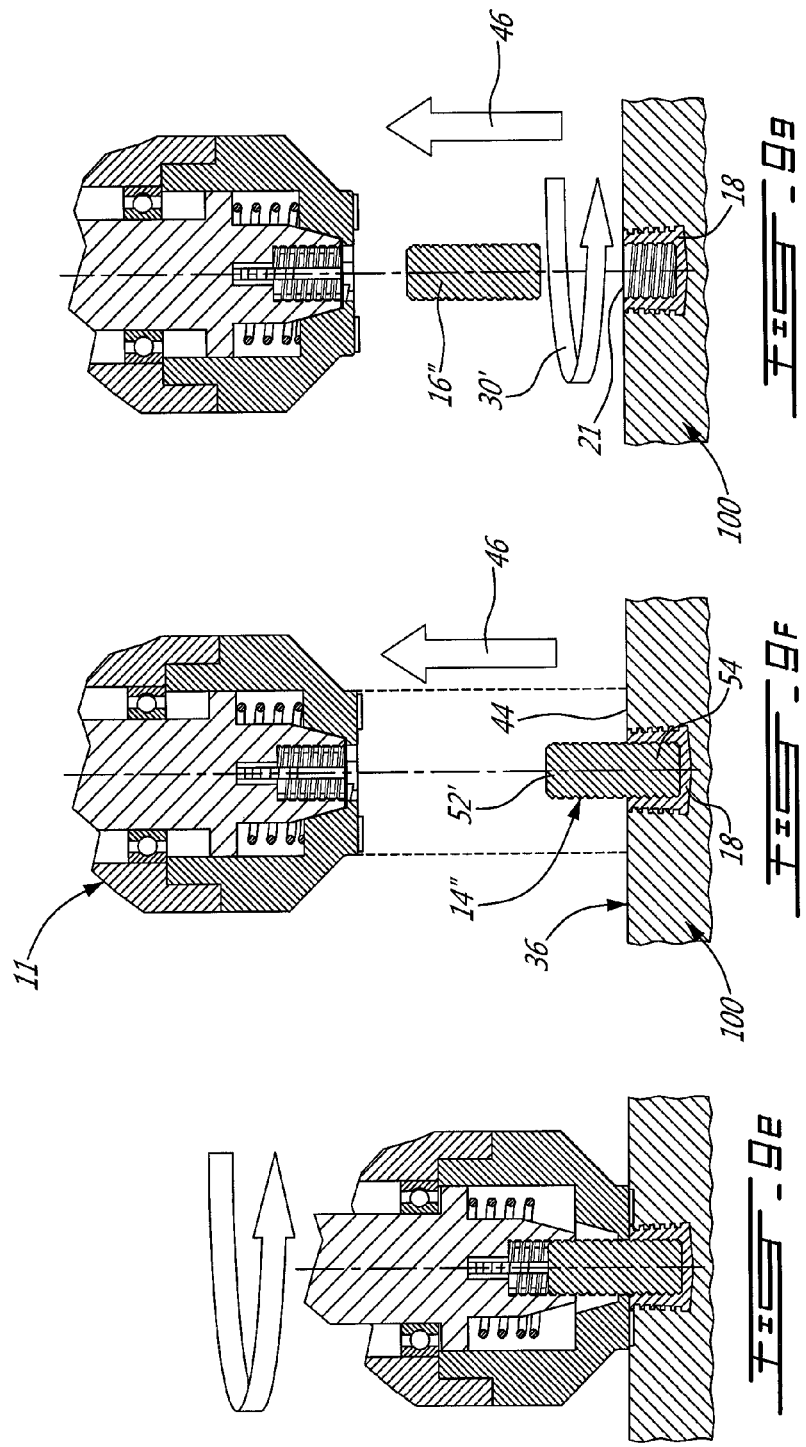

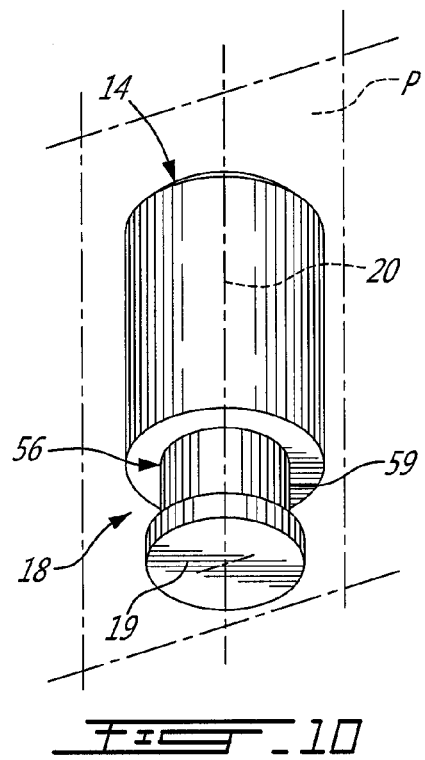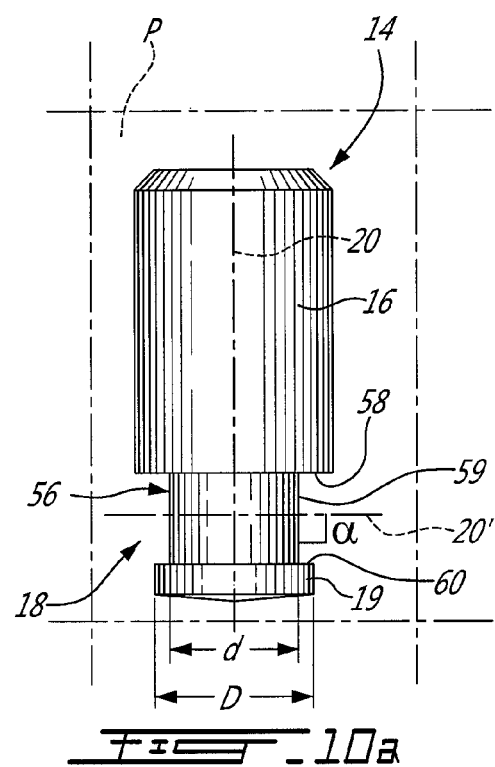
FIG. 10  FIG. 10a
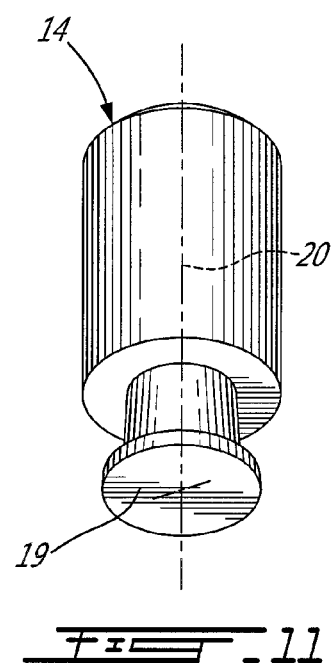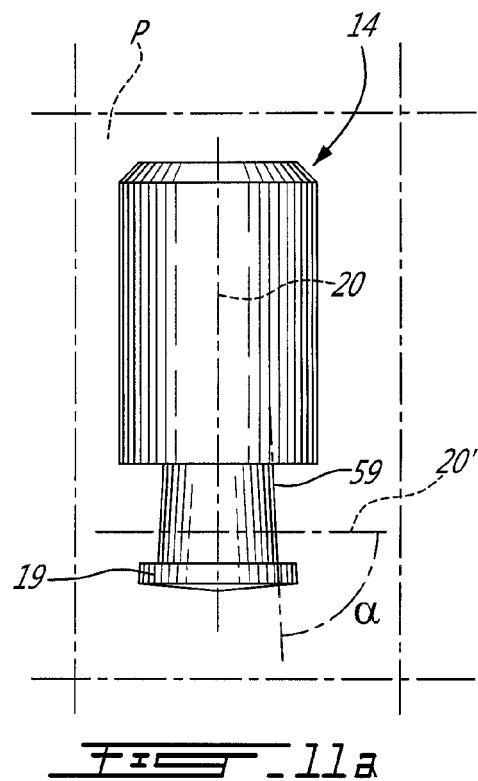
FIG. 11  FIG. 11a

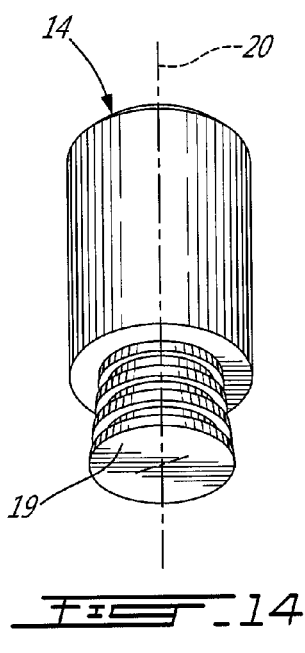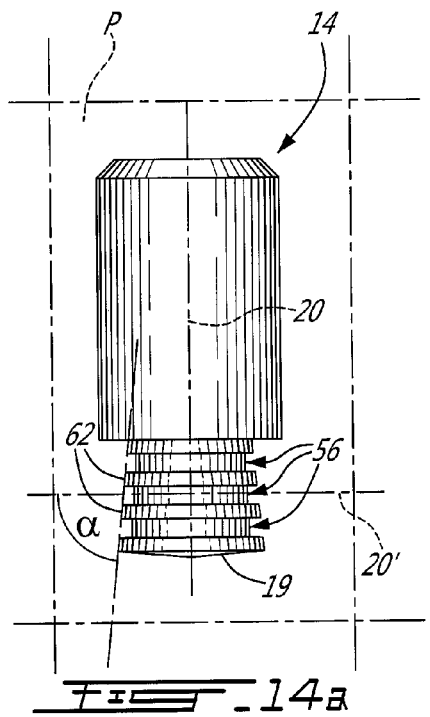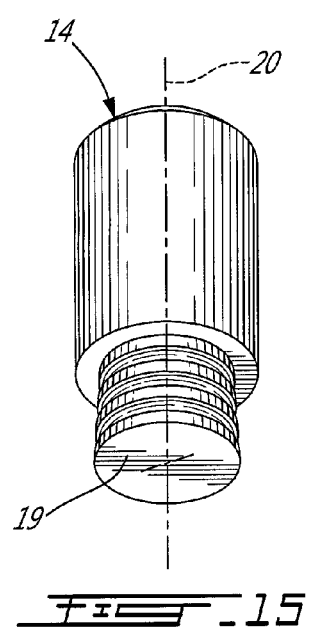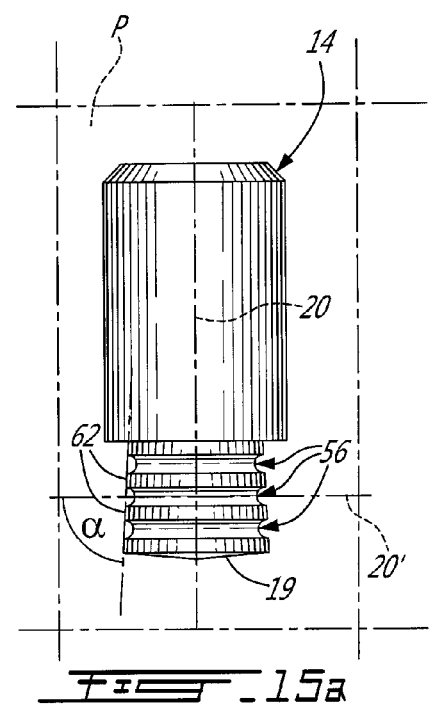

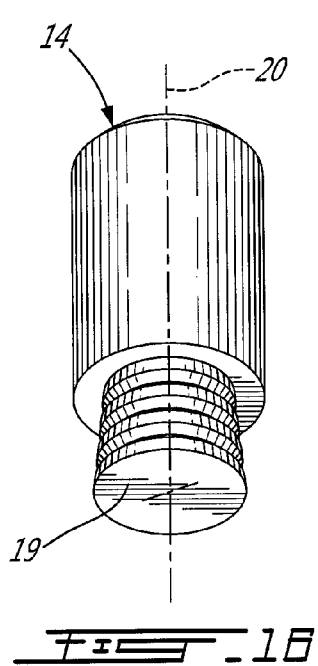
_FIG_.18
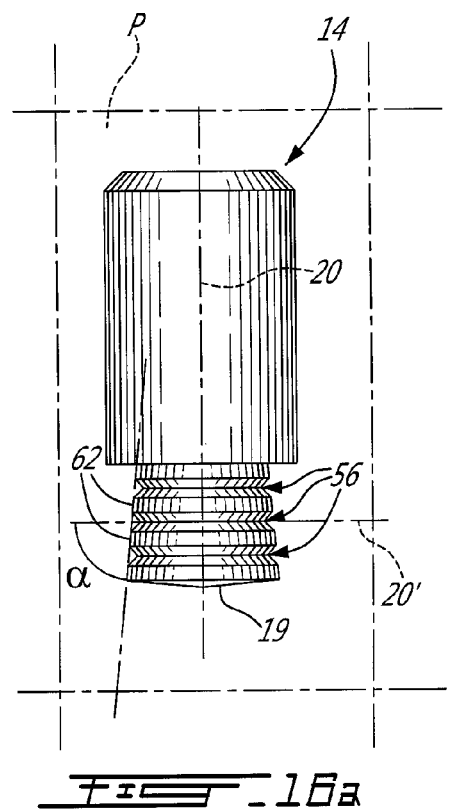
_FIG_.18a

APPARATUS AND METHOD FOR INSERTING A COMPONENT THROUGH THE SURFACE OF A WORKPIECE

FIELD OF THE INVENTION

The present invention relates to the field of product assembling, and more particularly to techniques for inserting various components into workpieces to form products.

Workpieces such as parts entering in the assembly of manufactured products usually need to receive components of various types at their assembly stage, such as fastening inserts, wear and impact protections pads, bearings, strengthening guides, packaged electronic devices, magnetic inserts, etc. For example, mechanical parts made of relatively soft metallic materials such as aluminium alloys do not exhibit the required strength properties to be machined for the purpose of forming a thread adapted to receive assembly components such as bolts, pins, rods, dowels, etc. To traverse that limitation, the design of the parts can be made to avoid or limit the need for such assembly components, but that approach generally involves more machining operations and more parts to produce the desired assembly. Alternative approaches have been applied to product assembly, such as the friction riveting method disclosed in U.S. Pat. No. 6,769,595 B2 issued to Stol et al., which method is aimed at joining metal components such as plates stacked upon each other with a rivet having a hardness substantially similar to at least one of the plates, wherein the rivet is held and rotated by a spindle and simultaneously plunged into the metal plates under pressure to friction weld and metallurgically bond the rivet to the metal components. That method uses a scraper device pivotally linked to the spindle for removing flash that escapes from the region of the joint and collects adjacent thereto on the surface of the exposed plate. Such known method using a separate scraper device is not capable of removing flash remaining on the exposed surface in contact with the end portion of the spindle until the latter is withdrawn, and the angle formed by the scraper cutting edge with the worked surface being varied during insertion, scraping uniformity cannot be achieved.

Various designs of components to be inserted through friction into workpieces as well as insertion methods and apparatus have been proposed heretofore, such as those disclosed in U.S. Pat. No. 7,695,227 B2 to Stevenson et al., U.S. Pat. No. 6,988,651 B2 to Stevenson et al. U.S. Pat. No. 6,729,531 B2 to Stevenson et al., U.S. Pat. No. 6,722,013 to Rapp, U.S. Pat. No. 6,676,007 B2 to Stevenson et al., U.S. Pat. No. 6,640,414 to Stevenson et al., U.S. Pat. No. 6,607,839 to Xie, U.S. Pat. No. 6,227,433 B1 to Waldron et al., U.S. Pat. No. 4,915,558 to Muller, U.S. Pat. No. 4,850,772, U.S. published patent application no. 2007/0172335 A1 to Christ, and U.S. published patent application no. 2006/0213954 A1 to Ruther et al. However, there is still a need for improved friction-based techniques for inserting components into workpieces, providing more flexibility and quality of assembling, as well as insertion strength comparable or better to that obtained with conventional mechanical joining techniques.

SUMMARY OF THE INVENTION

It is an object of the present invention to provide a rotary tool for inserting a component through a surface of a workpiece made of a material showing friction-induced plasticity to attach the component to the workpiece, as well as apparatus and method making use of such rotary tool, which advantages over assembling techniques of the prior art in terms of insertion quality and flexibility of use. The apparatus and methods of the present invention may be used for insertion of components of various natures, such as fastening inserts, wear and impact protections pads, bearings, strengthening guides, packaged electronic devices, magnetic inserts, etc., into workpieces made of a material showing friction-induced plasticity, such as found in products manufactured from metallic or thermoplastic material, without being limited to such examples of applications.

According to that object, there is provided a rotary tool for use with a rotary driving unit for inserting a component through a surface of a workpiece made of a first material showing friction-induced plasticity to attach said component to the workpiece, the component having an insert portion extending along an insertion axis of said component, at least an outer surface of the insert portion being made of a second material harder than the first material. The tool comprises a tool body adapted to be operationally coupled to the rotary driving unit and having a working end defining a shoulder portion and a securing device provided on the tool body for selectively engaging the component to impart rotation thereof upon operation of the rotary driving unit in a first direction while applying an axial force of a sufficient magnitude onto the component to produce insertion of the insert portion along said axis by plasticizing the first material through friction at least until the shoulder portion is contacting the workpiece surface while maintaining said axial force during a sufficient setting time without rotation to produce said attachment. The shoulder portion is provided with a deburring device capable of being displaced from an inoperative position upon rotation of the tool body in the first rotation direction, to an operative position whenever the tool body is caused to rotate in an opposite direction by the rotary driving unit following disengagement of the securing device with the component, to provide deburring of the workpiece surface in contact with the shoulder portion following said attachment.

According the to the above object, there is provided a method for inserting a component through a surface of a workpiece made of a first material showing friction-induced plasticity to attach said component to the workpiece, the component including an insert portion extending along an insertion axis of said component, at least an outer surface of the insert portion being made of a second material harder than the first material. The method comprises the steps of: i) providing a rotary tool having a body defining a shoulder portion provided with a deburring device capable of being displaced from an inoperative position upon rotation of the tool body in a first rotation direction, to an operative position whenever the tool body is caused to rotate in an opposite direction; ii) securing the component to the tool body; iii) rotating the rotary tool in the first direction while applying an axial force of a sufficient magnitude onto the component to produce insertion of the insert portion along said axis by plasticizing the first material through friction at least until said shoulder portion is contacting the workpiece surface; iv) maintaining the axial force during a sufficient setting time without rotation to produce said attachment; v) releasing the component from the tool body; and vi) rotating the rotary tool in the opposite direction to provide deburring of said workpiece surface in contact with the shoulder portion following said attachment.

According the to the above object, there is provided an apparatus for inserting a component through a surface of a workpiece made of a first material showing friction-induced plasticity to attach said component to the workpiece, the component having an insert portion extending along an insertion axis of said component, at least an outer surface of the insert portion being made of a second material harder than the first material. The apparatus comprises a rotary driving unit, a rotary tool having a body being operationally coupled to the rotary driving unit and having a working end defining a shoulder portion, and a securing device provided on the tool body for selectively engaging the component to impart rotation thereof upon operation of the rotary driving unit in a first direction while applying an axial force of a sufficient magnitude onto the component to produce insertion of the insert portion along said axis by plasticizing the first material through friction at least until the shoulder portion is contacting the workpiece surface while maintaining the axial force during a sufficient setting time without rotation to produce said attachment. The shoulder portion is provided with a deburring device capable of being displaced from an inoperative position upon rotation of the tool body in the first rotation direction, to an operative position whenever the tool body is caused to rotate in an opposite direction by the rotary driving unit following disengagement of the securing device with the component, to provide deburring of the workpiece surface in contact with the shoulder portion following said attachment.

It is another object of the present invention to provide components and insertion methods therefor, for use with a rotary tool, which components are to be inserted through a surface of a workpiece for attachment thereto, which components and methods provide more flexibility and quality of assembling, as well as insertion strength comparable or better to that obtained with conventional mechanical assembling techniques.

According to that other object, there is provided a component for use with a rotary tool and to be inserted through a surface of a workpiece made of a first material showing friction-induced plasticity for attachment to the workpiece. The component comprises a head portion having a base and a working end being threaded at its outer surface and an insert portion having a penetrating end and extending along an insertion axis of said component, at least an outer surface of the insert portion being made of a second material harder than the first material. The insert portion is provided with a threaded bore closed at the penetrating end and extending along the insertion axis to initially receive the threaded working end. The head portion base is adapted to be secured to the rotary tool for rotation in a first direction while applying an axial force of a sufficient magnitude onto the head portion base to produce substantially full insertion of the insert portion along the insertion axis by plasticizing the first material through friction and to produce said attachment after a sufficient setting time.

Still according to that other object, there is provided a method for inserting a component through a surface of a workpiece made of a first material showing friction-induced plasticity to attach the component to the workpiece, the component including a head portion having a base and a working end being threaded at its outer surface and an insert portion having a penetrating end and extending along an insertion axis of said component, the insert portion being provided with a threaded bore closed at the penetrating end and extending along the insertion axis to initially receive the threaded working end, at least an outer surface of the insert portion being made of a second material harder than the first material. The method comprises the steps of: i) providing a rotary tool having a body defining a shoulder portion; ii) securing the head portion base to the tool body; iii) rotating the rotary tool in a first direction while applying an axial force of a sufficient magnitude onto the head portion base to produce substantially full insertion of the insert portion along the insertion axis by plasticizing the first material through friction at least until the shoulder portion is contacting the workpiece surface (36); and iv) maintaining the axial force during a sufficient setting time without rotation to produce said attachment.

Still according to that other object, there is provided a component for use with a rotary tool and to be inserted through a surface of a workpiece made of a first material showing friction-induced plasticity for attachment to the workpiece, the component comprising an insert portion extending along an insertion axis of said component and having a penetrating end defining a maximum outer diameter of said insert portion, at least an outer surface of the insert portion including said penetrating end being made of a second material harder than the first material, said outer surface forms at least one generally circular anchoring recess centered with reference to the insertion axis and defining a minimum diameter smaller that the maximum outer diameter. The component is adapted to be secured to the rotary tool for rotation in a first direction while applying an axial force of a sufficient magnitude onto the component to produce substantially full insertion of the insert portion along the insertion axis by plasticizing the first material through friction which fills the anchoring section to produce said attachment after a sufficient setting time.

BRIEF DESCRIPTION OF THE DRAWINGS

Preferred embodiments of the present invention will now be described in view of the accompanying drawings, in which:

FIG. 1 is a cross-sectional view of a first example of component insertion apparatus provided with a rotary tool coupled to a rotary driving unit;

FIG. 1a is a partial enlarged view of the rotary tool of FIG. 1 according to detail 1a, showing a working end of the rotary tool body and securing device provided thereon;

FIG. 1b is a perspective view of the securing device of FIG. 1a;

FIG. 2 is a cross-sectional view of a second example of component insertion apparatus provided with a rotary tool coupled to a rotary driving unit;

FIG. 5a is a partial schematic cross-sectional view of a cutting element of a deburring device provided on the rotary tool working end of FIG. 4a, shown in an inoperative position upon rotation of the tool body in the first rotation direction;

FIG. 5b is a partial schematic cross-sectional view of the cutting element of the deburring device provided on the rotary tool working end of FIG. 4b, shown in an operative, deburring position when the tool body is caused to rotate in the opposite direction.

FIGS. 6a to 6e are cross-sectional views of the rotary tool working end of FIG. 1a, showing the steps of a basic method for inserting a component in the form of a dowel into a workpiece;

FIGS. 7a to 7f are cross-sectional views of the rotary tool working end of FIG. 2a, showing the steps of alternate method for inserting a component in the form of a threaded rod into a workpiece;

FIGS. 8a to 8f are cross-sectional views of the rotary tool working end of FIG. 1a, showing the steps of alternate method for inserting a component in the form of a threaded sleeve and rod arrangement;

FIGS. 9a to 9g are cross-sectional views of the rotary tool working end of FIG. 2a, showing the steps of alternate method for inserting a component in the form of another type of threaded sleeve and rod arrangement;

FIGS. 10 and 10a are perspective and front views, respectively, of a component to be inserted through the surface of a workpiece, according to a basic design;

FIGS. 11 and 11a are perspective and front views, respectively, of a component to be inserted through the surface of a workpiece, according to a variant of the design shown on FIGS. 10 and 10a;

FIGS. 14 and 14a, are perspective and front views, respectively, of a variant of the component of FIGS. 12 and 12a, using an angular insert configuration.

FIGS. 15 and 15a, are perspective and front views, respectively, of a variant of the component of FIGS. 14 and 14a, using an angular insert configuration;

FIGS. 16 and 16a, are perspective and front views, respectively, of another variant of the component of FIGS. 14 and 14a, which uses a plurality of anchoring recesses of a generally V-shape cross-section;

DETAILED DESCRIPTION OF THE SHOWN EMBODIMENTS

Figure 2A:
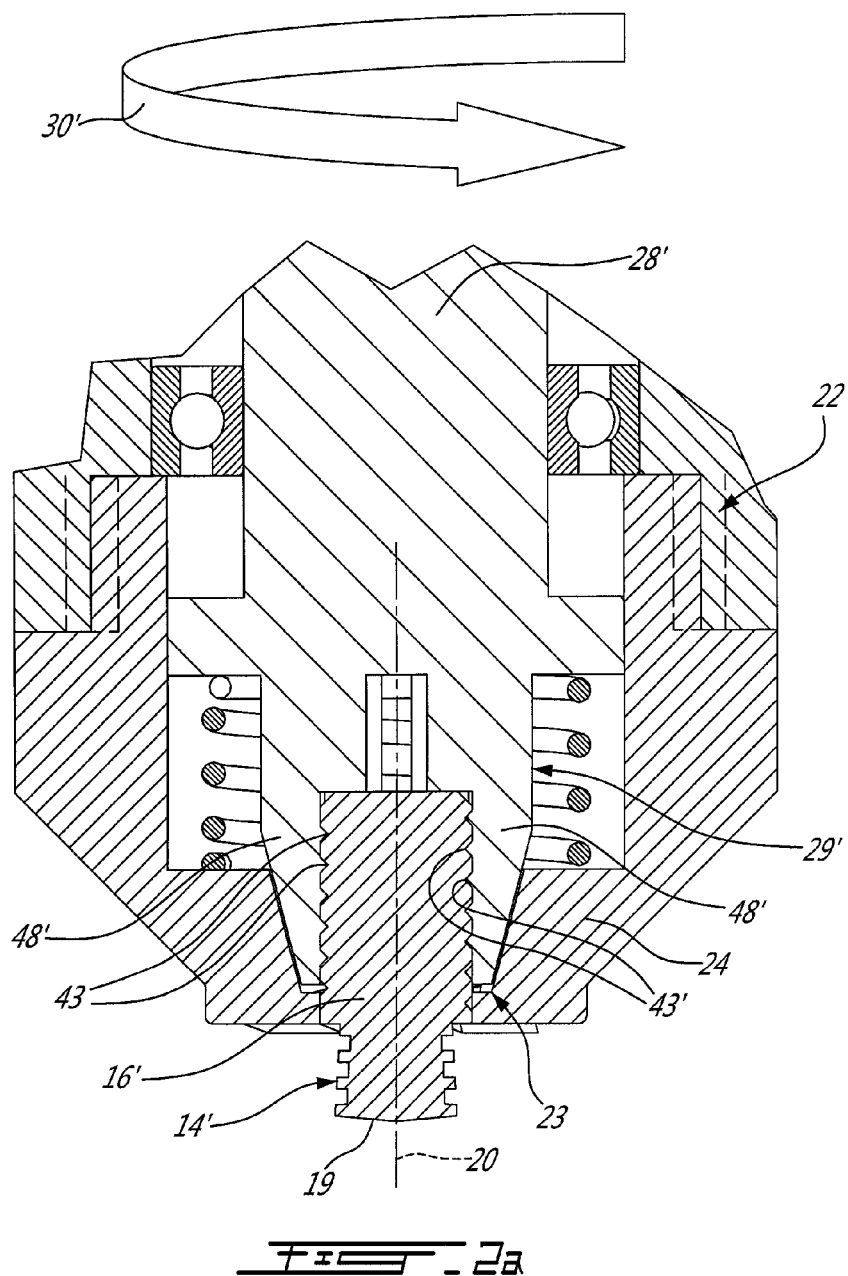
FIG. 2a is a partial enlarged view of the rotary tool of FIG. 2 according to detail 2a, showing a working end of the rotary tool body.

Referring now to FIG. 1, there is shown a first example of component insertion apparatus generally designated at 10, which is designed for inserting a component 14 through a surface 36 of a workpiece 100 made of a first material showing friction-induced plasticity to attach the component 14 to the workpiece while the latter is rigidly held on a holder (not shown), in a manner that will be explained below in more detail in the context of various application examples. The apparatus 10 includes a rotary tool 11 and a rotary driving unit 12, which rotary tool 11 has a body 22 in the form of a tubular shaft mounted for rotation relative to a stationary case 15 as part of the rotary driving unit 12 and provided with bearings 25, which body 22 is operationally coupled to a mechanical power source such as electric motor 13 provided on the rotary driving unit 12, through driving pulley 31 and driven pulley 32 linked by a driving belt 33. The rotary driving unit include mechanical means (not shown) to position the rotary tool with respect to the surface of the workpiece 100 within a reference system "S" as shown on FIG. 1, which mechanical means must be capable to apply and stand a high axial insertion force (along z axis shown on FIG. 1) onto the component 14, in a manner that will be explained below in detail. For example, such mechanical means may be a robot arm, any machining or milling equipment having three-axis translation capability relative to a fixed workpiece holder, or any one-axis or two-axis machining equipment cooperating with an appropriate positioning workpiece holder. It is to be understood that any other appropriate rotary driving unit can be readily chosen by a person skilled in the art of mechanical engineering from industrial machining equipment available in the marketplace. For example, the rotary driving unit 12 may use any other appropriate type of driving and mechanical coupling devices such as hydraulic or pneumatic power sources and gears. Turning now to FIG. 1a, the component 14 in the example shown has a head portion 16 and an insert portion 18 having a penetrating end 19 and extending along an insertion axis 20 of component 14. The head portion 16 shown has a cylindrical shape with a flat lateral surface, and is beveled at its top surface for use as a dowel adapted to be received in a corresponding bore provided on another part to be joined to the workpiece to form an assembly. It is to be understood that the head portion may present any other appropriate geometrical shape for similar assembling purposes, and that while the penetrating end shown is conveniently conical, it could be of any other appropriate geometrical shape, such as beveled, pyramidal shape, adapted to facilitate penetration of the component into the workpiece surface. To provide the necessary friction and heat resistance to the component 14, at least the outer surface of its insert portion 18 is made of a material harder than the first material of which the workpiece is made. Its hardness must be sufficient to ensure that the mechanical properties of the component are not adversely affected as a result of the insertion stress. For example, in a case where the workpiece into which the component is inserted is made of an aluminum alloy, the outer surface of component insert portion 18 may be made from steel. The rotary tool body 22 has a working end 24 defining a shoulder portion 26 as better shown on FIG. 3. Optionally, the shoulder portion may be provided with superficial grooves (not shown) to improve stirring throughout the workpiece surface in contact with shoulder portion 26. As also shown on FIG. 1a, a securing device 28 is also provided on the tool body 22 for selectively engaging the component 14 to impart rotation thereof upon operation of the rotary driving unit 12 in a first direction as indicated by arrow 30. For so doing, as shown on FIG. 1, a first end 27 of the securing device 28 is coupled for rotation through bearings 37 to the working element of a linear actuator 35 as part of the rotary driving unit 12, while the body 41 of securing device 28 is free to rotate within the tool body 22 using bearings 39. The linear actuator is preferably of a hydraulic type to stand high axial force applied to the component, as will be explained below in detail. In the example shown on FIG. 1a, the working end 24 forms a chuck provided with an aperture 23 extending along axis 20 for receiving the component head portion 16, and the securing device 28 includes at its second end a jaw mechanism 29 lodged within a cylinder cavity 49 provided on the chuck at the periphery of aperture 23 and being selectively displaceable upon reciprocal operation of the linear actuator 35 between a securing position as shown on FIG. 1a following a forward movement of the securing device 28 in the direction of arrow 45, and a release position upon backward force exerted by a coil spring 47 on a ring portion 51 of the jaw mechanism 29, as will be explained below in more detail. As shown on FIG. 1a in view of FIG. 1b, the jaw mechanism 29 is formed of a plurality of jaw elements 48 circularly distributed adjacent a clearance bore 50 extending through insertion axis 20 provided on a base portion of the jaw mechanism 29, allowing a required level of flexion of jaw elements 48. By providing the end section 17 of the chuck aperture 23 with a conical profile, a displacement of the jaw mechanism 29 along axis 20 forwardly though the conical section causes an inward flexion of jaw elements 28 resulting in the securing position, while an opposite, rearward displacement upon spring back force causes an outward flexion of jaw elements 28 allowing to reach the release position, as will be explained below in more detail. It is to be understood that any other appropriate securing mechanism capable of selective engagement with the component head portion 16 may be used. Moreover, the securing mechanism could be designed to perform component feeding from a magazine integrated in the tool body.

Figure 3:
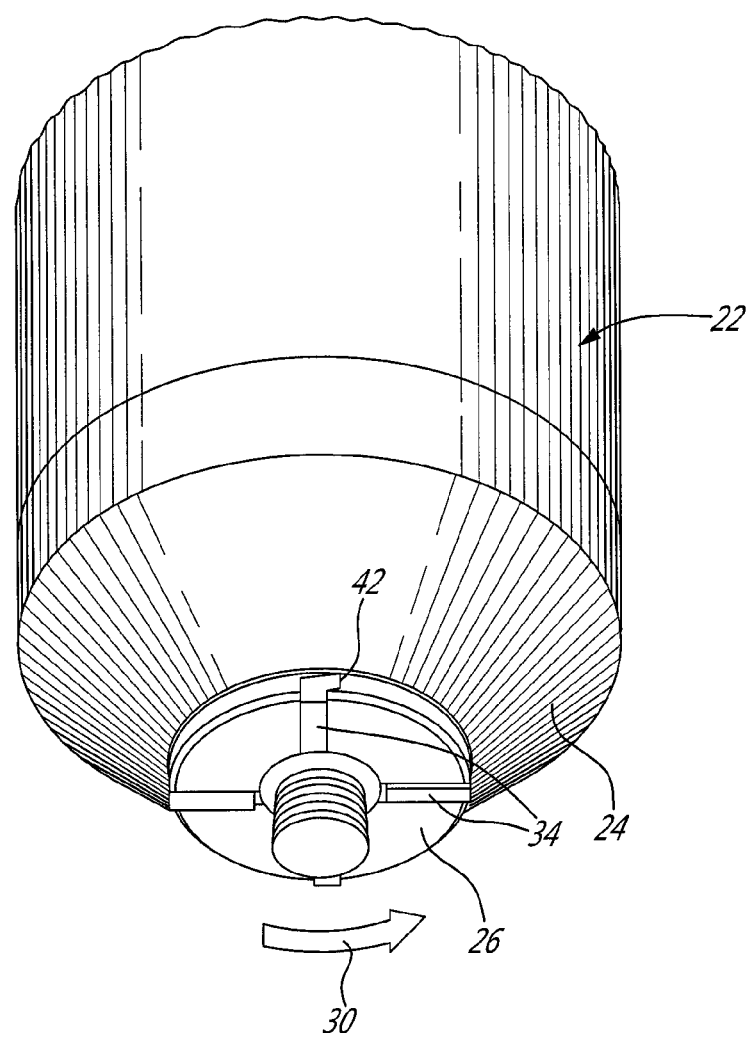
FIG. 3 is a partial perspective view of the working end provided on the rotary tool body of FIG. 1a or 2a, showing the shoulder portion and deburring device provided thereon.
Figure 4B:
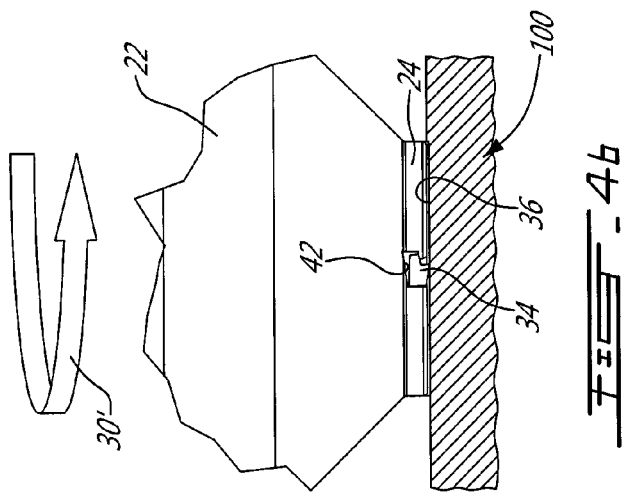
FIG. 4b is a front view of the rotary tool working end of FIG. 3, shown in contact with the surface of a workpiece after component insertion and as subjected to deburring upon rotation of the tool body in the opposite direction.
Figure 4A:
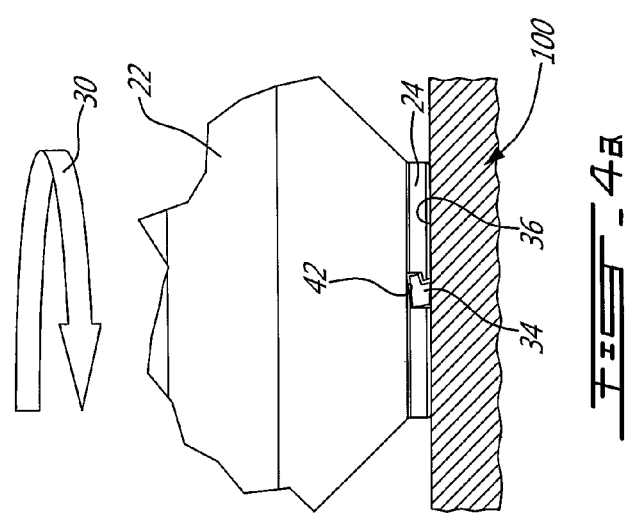
FIG. 4a is a front view of the rotary tool working end of FIG. 3, shown in contact with the surface of a workpiece at the end of the component insertion step upon rotation of the tool body in a first direction.
Figure 3A:
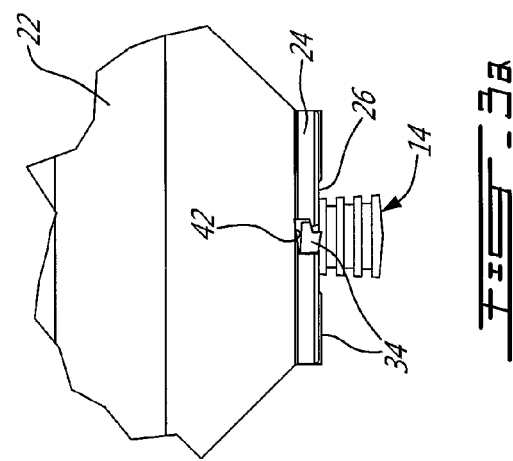
FIG. 3a is a front view of the rotary tool working end of FIG. 3.
Figure 6D:
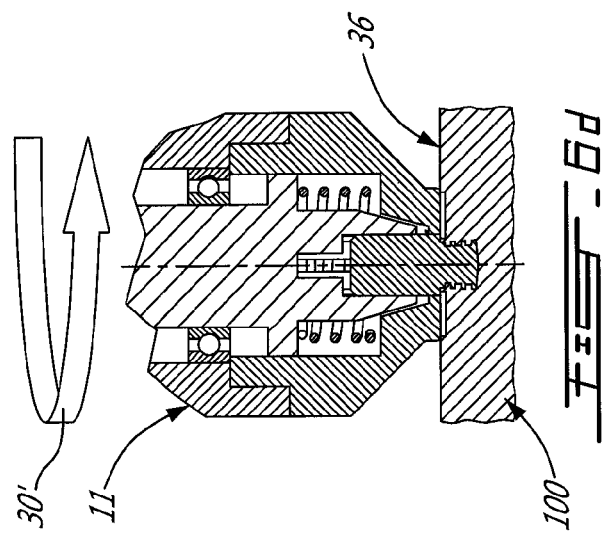
Figure 6E:
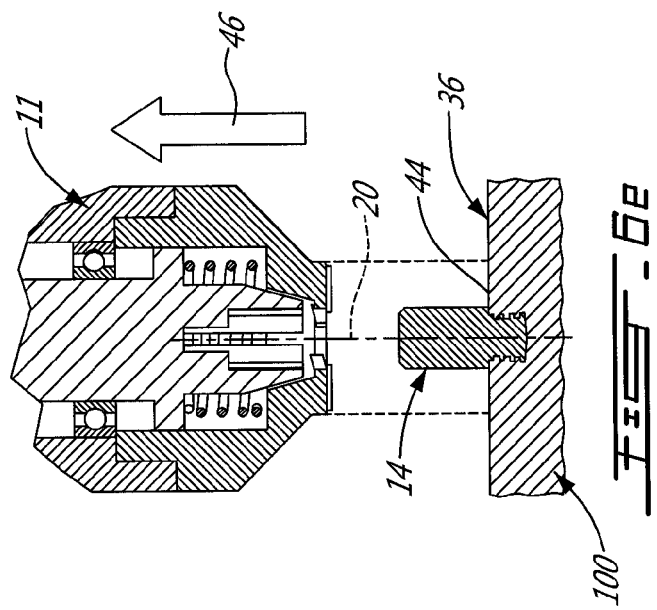

Referring now to FIGS. 3 and 3a in view of FIGS. 4a and 4b, the shoulder portion 26 is provided with a deburring device for removing burrs that form at the surface of the workpiece by expulsed plasticized material as a result of component insertion. According to the present example, the deburring device in the form one or more cutting elements 34 capable of being displaced from an inoperative position upon rotation of the tool body 22 in the first rotation direction indicated by arrow 30 shown on FIG. 4a, to an operative position as shown on FIG. 4b in view of FIG. 2b, whenever the tool body 22 is caused to rotate in an opposite direction as designated by arrow 30', by the action of the rotary driving unit 12 following disengagement of the securing device 28 with the component 14 as described above in view of FIGS. 1 and 1a, to provide deburring of the workpiece surface 36 following attachment of the component 14 to the workpiece 100.

Turning now to FIGS. 5a and 5b, it can be seen that each cutting element 34 has a cutting edge 38 and an opposite base portion 40 received in a radially extending recess 42 provided on shoulder portion 26. As shown on FIG. 5a in view of FIG. 4a, the base portion 40 is designed to be capable of being brought in full engagement with recess 42 upon rotation of the tool body 22 in the first direction 30 so that the cutting edge 38 is maintained substantially retracted within the recess 42 in the inoperative position. As shown on FIG. 5b in view of FIG. 4b, the base portion 40 is also designed to be capable of being brought in partial engagement with the recess 42 upon rotation of the tool body 22 in the opposite direction 30' so that the cutting edge 38 is maintained substantially projected from the recess 42 in the operative position wherein workpiece surface 36 is being deburred, leaving a flat surface area 44 behind upon a sufficient number of tool revolutions.

Referring now to FIG. 2, there is shown a second example of component insertion apparatus generally designated at 10', which is designed for inserting into workpiece 100 a component 14' of a different design as compared to the component 14 described above in the context of the first example. Turning now to FIG. 2a, the component 14 in this example includes a head portion 16' of a cylindrical shape and provided with a thread 43 on its lateral surface, to be used as a threaded rod adapted to be received in a corresponding threaded bore provided on another part to be joined to the workpiece to form an assembly. In the second example shown on FIG. 2a, the working end 24 also forms a chuck provided with an aperture 23 extending along axis 20 for receiving the component head portion 16, and the securing device 28 includes at its second end a jaw mechanism 29' located within the chuck at the periphery of aperture 23. In order to allow engagement of the component 14' with the tool body 22, the jaw elements 48' as part of the jaw mechanism 29' provided on the securing device 28' are provided with a thread 43' adapted to mate with the corresponding thread 43 of component head portion 16' when the device 28' is brought to its securing position. Furthermore, the jaw mechanism 29' is made selectively displaceable not only upon reciprocal operation of the linear actuator 35 between a securing position as shown on FIG. 2a and a release position, but also with simultaneous rotation in the second direction 30' to provide full release of the thread 43 of component head portion 16' with the corresponding thread 43' of jaw mechanism 29'. For so doing, as shown on FIG. 2, the securing device 22 is operationally coupled to a second mechanical power source such as electric motor 13' provided on the rotary driving unit 12' through second driving pulley 31' and driven pulley 32' linked by a driving belt 33'.

Figure 7F:
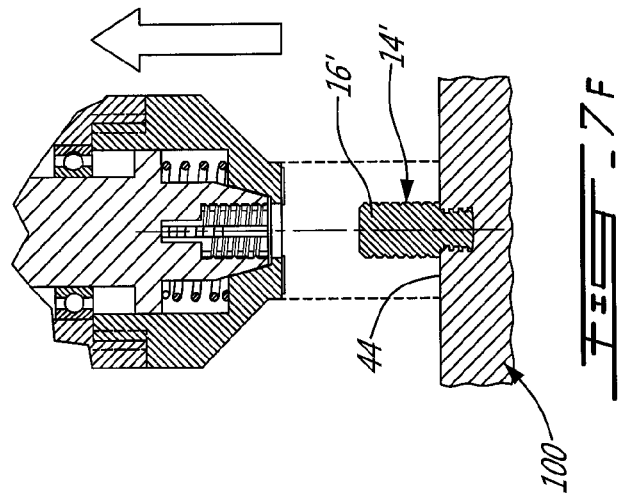
Figure 7E:
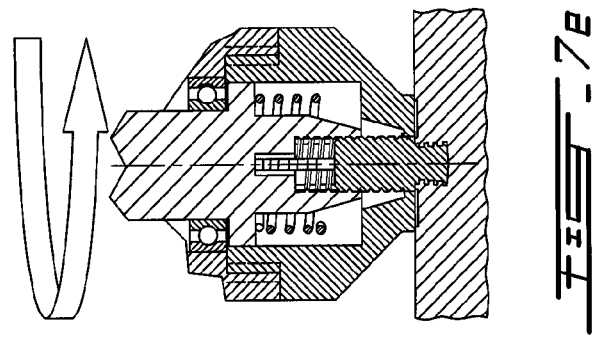
Figure 7D:
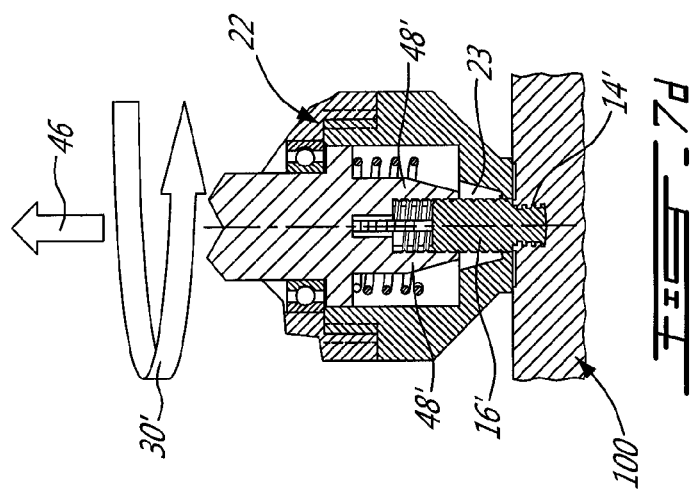
Figure 9D:
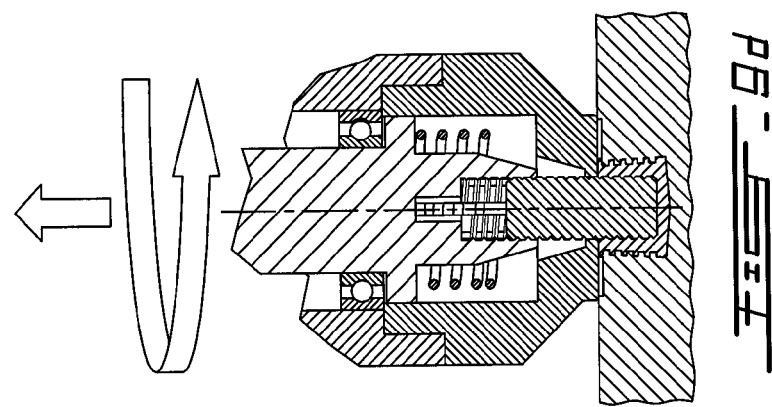
Figure 9C:
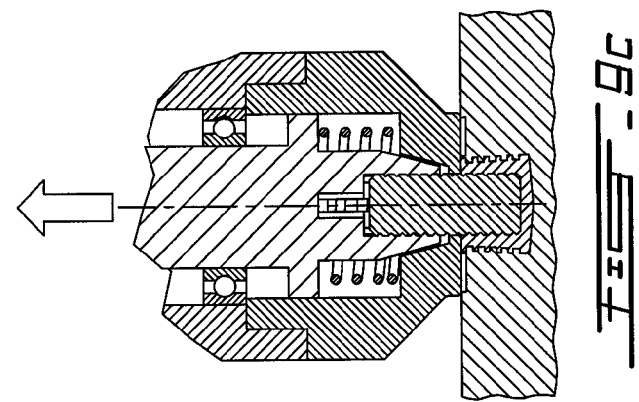

A basic mode of operation of a method for inserting a component 14 in the form of a dowel into a workpiece 100 such as a thick metallic plate, using the apparatus 10 as described above in view FIGS. 1 and 1a will now be explained with reference to FIGS. 6a to 6e. After having secured the component 14 to the tool body 22 with the securing device 29, at an initial step of the component insertion procedure as shown on FIG. 6a, the rotary tool 11 and the component 14 secured thereto are rotated in the first direction 30, typically at a rotation speed from about 800 to 1500 RPM depending on the characteristics of the workpiece material, while applying an axial force onto the component 14 as indicated by arrow 45, which force is of a sufficient magnitude, typically from about 6 to 10 kN depending on the characteristics of the workpiece material, the design of the insertion component and the applied rate of insertion, to produce insertion of the insert portion 18 along axis 20 by plasticizing the material through friction, at least until the shoulder portion 26 of the tool body 22 is contacting the workpiece surface 36 as shown on FIG. 6b. In practice, an insertion rate of about 1.5 mm/s with rotation speed of 1000 RPM has proved to properly plasticize aluminium material such as 6061-T6 alloy. Other values of insertion rate can be applied depending upon the nature of workpiece material involved and the design of the insertion component used. Then, the rotation is stopped and the axial force is maintained during a sufficient setting time without rotation to produce attachment of the component 14 to the workpiece surface 36. Typically for aluminium, a time of about 2.5 s is sufficient to leave the stirred material to set as temperature is decreasing after friction stopped. Then, the component 14 is released from the tool body 22 by appropriate action of the jaw mechanism 29 in backward direction as indicated by arrow 46 on FIG. 6c. Following disengagement of the securing device 29 with the component 14, the rotary tool 11 is caused to rotate in opposite direction 30' as shown on FIG. 6d, to provide deburring of the workpiece surface 36 in contact with the shoulder portion 26. Typically, dependent upon the hardness of the workpiece material, the deburring may be completed in a few second following a sufficient number of tool revolutions. Finally, after the completion of component insertion and deburring, the rotary tool 11 is displaced away from the workpiece surface 36 along axis 20 in a direction indicated by arrow 46 to withdraw the tool 11 from the component 14 as shown on FIG. 6e, leaving a deburred, flat surface area 44 on workpiece surface 36 as schematically delimited by dotted lines, around the protruding portion of component 14 which is ready to be received in a corresponding hole provided on another workpiece to form an assembly. An alternate mode of operation of a method for inserting in a workpiece a component 14' in the form of a rod having threaded head portion 16' as described above in view of FIG. 2a, using the alternate apparatus 10' as described above in view FIGS. 2 and 2a, will now be explained with reference to FIGS. 7a to 7f. Prior to the insertion procedure, the component 14' is brought into engagement with the tool body 22 by operating the linear actuator to forwardly move the securing device 29' toward the component threaded head portion 16' while operating the rotary drive unit to rotate in the first direction 30 so that the threaded jaw elements 48' enters the conical end portion of the chuck aperture 23 and fully engages the component 14' as shown on FIG. 7a. The first three steps of the insertion method for component 14' as illustrated on FIGS. 7a to 7c are essentially the same as those explained above for component 14 in view of FIGS. 6a to 6c. However, to provide full release of the threaded head portion 16' of component 14' from the tool body 22, the rotary drive unit is operated to rotate in the second direction 30' so that the threaded jaw elements 48' exits the conical end portion of the chuck aperture 23 in the direction of arrow 46 as shown on FIG. 7d. Following disengagement of the securing device 29' with the component 14', the surface deburring and component withdrawal steps as respectively illustrated on FIGS. 7e and 7f are carried out essentially in a same way as those explained above for component 14 in view of FIGS. 6d and 6e. As a result, the threaded head portion 16' of component 14' surrounded by the deburred area 44 is ready to be received in a corresponding threaded hole provided on another workpiece to form an assembly.

Turning now to FIGS. 8a to 8f, the various steps of a proposed method for inserting in a workpiece 100 a component 14" in the form of a threaded sleeve and rod arrangement, using the apparatus 10 as described above in view FIGS. 1 and 1a, will now be described. As shown on FIG. 8a, the component 14" to be inserted has a component insert portion 18 in the form of a sleeve, which has a penetrating end 19 and is provided with a threaded bore 21 closed at penetrating end 19, and extends along insertion axis 20. The component 14" further includes a head portion 16" having a base 52 adapted to be initially secured to the tool body 22, and a working end 54 being threaded at its outer surface for engagement with the threaded bore 21. The first four steps of the insertion method for component 14" as illustrated on FIGS. 8a to 8d are essentially the same as those explained above for component 14 in view of FIGS. 6a to 6d. Following the deburring step illustrated on FIG. 8d, a first option consists of displacing the rotary tool 11 away from the workpiece surface 36 along axis 20 to withdraw the tool 11 from the head portion base 52, in a same way as explained above in view of FIG. 6e, leaving a deburred, flat surface area 44 on workpiece surface 36 around the protruding base portion 52 ready to be received in a corresponding hole provided on another workpiece to form an assembly. Another option, as shown on FIGS. 8e and 8f, is aimed at leaving only the insert portion to be used as a threaded sleeve ready to receive a corresponding threaded component for assembly purposes. For so doing, the securing step is repeated whereby the jaw mechanism 29 engages again the component head portion base 52 in the direction of arrow as illustrated on FIG. 8e, in the same way as explained before in view of FIG. 1a. Then, as shown on FIG. 8f, the threaded working end 54 being adapted to be released from the threaded bore 21 to remove head portion 16" from insert portion 18, the rotary tool 11 is being displaced away from the workpiece surface 36 along axis 20 in the direction of arrow 46 while rotating the tool 11 in the second, opposite direction as indicated by arrow 30' to withdraw the tool 11 while removing the head working end 54 from the threaded bore 21, leaving only the insert portion 18 attached to the workpiece 100. Conveniently, in order to facilitate release of threaded working end 54 from the threaded bore 21, the thread of working end 54 may be of an easy-loosening design relative to the receiving thread of the workpiece, as well known in the art.

Turning now to FIGS. 9a to 9g, a method for inserting in a workpiece 100 a variant of component 14" in the form of a threaded sleeve and rod arrangement, using the alternate apparatus 10' as described above in view FIGS. 2 and 2a, will now be explained. As shown on FIG. 9a, the component 14" to be inserted has a head portion 16" having a base 52' which is threaded in order to mate with the corresponding thread 43' provided on the securing device 28' as described above in view of FIG. 2a. Apart from the presence of a thread, the component 14" is identical to the one described above in view of FIGS. 8a to 8f. Prior to the insertion procedure, the component 14" is brought into engagement with the tool body 22 by operating the linear actuator to forwardly move the securing device 29' toward the head portion threaded base 52' while operating the rotary drive unit 12 to rotate in the first direction 30 so that the threaded jaw elements 48' enters the conical end portion of the chuck aperture 23 and fully engages the component 14" as shown on FIG. 9a. The steps of the insertion method for component 14" as illustrated on FIGS. 9a to 9f are essentially the same as those explained above for component 14' in view of FIGS. 7a to 7f, the head portion base 52' being adapted to be released from the rotary tool 11 following attachment to the workpiece 100. After the completion of component insertion and deburring steps, the rotary tool 11 is displaced away from the workpiece surface 36 along axis 20 in a direction indicated by arrow 46 to withdraw the tool 11 from the component 14" as shown on FIG. 9f, the head portion 16" remaining attached to the workpiece 100 by engagement of the head working end 54 with the insert portion 18 following release of the head portion base 52' from the rotary tool 11, leaving a deburred surface area 44 surrounding top edge of insert 18 and the threaded head portion base 52' of component 14", which is ready to be received in a corresponding threaded hole provided on another workpiece to form an assembly. Optionally, as shown on FIG. 9g, the head portion 16" may be withdrawn from the threaded bore 21 as indicated by arrow 46 by rotating the head portion in direction 30' with the help of any appropriate tool, to leave the threaded insert portion 18 attached to the workpiece 100 and ready to receive any other component having a corresponding thread for assembly purposes.

Generally, the proposed component inserting methods do not require drilling a pre-bore into the workpiece prior to component insertion. However, such pre-bore may be required for the purposes of inserting large size components. The workpiece may also be formed by a plurality of elements, such as overlapping plates.

Now, various components designed to be inserted through a surface of a workpiece for attachment thereto will be described in view of FIGS. 10 to 16a. The proposed designs of insertion component are inexpensive to manufacture, and have proved to exhibit comparable or better tensile and shear strength with respect to a conventional bolted component as will be explained below in more detail. Furthermore, these designs are aimed at reducing magnitude of the axial force required for insertion to obtain a better attachment position accuracy of the component following insertion, contributing to assembling quality. Moreover, the proposed designs provide flexibility of assembling, being adapted to be applied to various kinds of components, such as fastening inserts, wear and impact protections pads, bearings, strengthening guides, packaged electronic devices, magnetic inserts, etc. Referring to FIGS. 10 and 10a, there is shown a basic design for component 14 for use with any appropriate rotary tool, which component 14 is to be inserted through a surface of a workpiece made of a first material showing friction-induced plasticity for attachment to the workpiece. The component 14 according to this basic design comprises an insert portion 18 extending along component insertion axis 20 and having a penetrating end 19 defining a conical surface, the angle of which may be chosen between about 5° and 10° to reduce insertion force while limiting lateral forces along x and y axis at acceptable values, which penetrating end 19 defines a maximum outer diameter "D" of insert portion 18. A least the outer, inserting surface of insert portion 18, including the penetrating end 19, is made of a second material harder than the first material. For the basic design shown, the component outer surface, including bottom surface 58 of component head 16 and upper surface 60 of penetrating end 19 in the design shown, forms a generally circular anchoring recess 56 and being centered with reference to axis 20 and having an inner portion 59 defining a minimum diameter "d" smaller that maximum outer diameter "D". As will be described below, more than one anchoring recess may be provided on the component 14. The component 14 is adapted to be secured to the rotary tool for rotation in a first direction while applying an axial force of a sufficient magnitude onto the component to produce substantially full insertion of the insert portion 18 along axis 20 by plasticizing the first material through friction which fills the anchoring recess 56 to produce attachment of component 14 to the workpiece after a sufficient setting time. Generally, a ratio of minimum diameter "d" with respect to maximum outer diameter "D", chosen between about 65% and 90% results in insertion strength in term of tensile and shear strength comparable or better to that obtained with conventional mechanical assembling techniques. Preferably, this ratio is chosen to be between about 72% and 88% to obtain joints exhibiting still better mechanical properties. More specifically, a ratio of about 85% is likely to be optimal. According the basic design, the recess 56 is of a generally a U-shape cross-section in a plane "P" common to axis 20, as better shown on FIG. 10. It can be seen from FIG. 10a that for the basic design, the recess inner portion 59 extends toward the penetrating end 19 to form in plane "P" a right angle "α" with respect to an axis 20' perpendicular to insertion axis 20 and passing through the recess 56. However, turning to FIGS. 11 and 11a illustrating a variant of component 14 designed to provide still better mechanical properties, it can be seen that an angle "α" different from 90° may be chosen, wherein inner portion 59 extends outwardly in direction of penetrating end 19 to form in plane "P" an angle "α" between about 80° and 88° with respect to axis 20'. Preferably, angle "α" is chosen to be between about 84° and 87° to obtain joints exhibiting even better mechanical properties.

Figure 12:
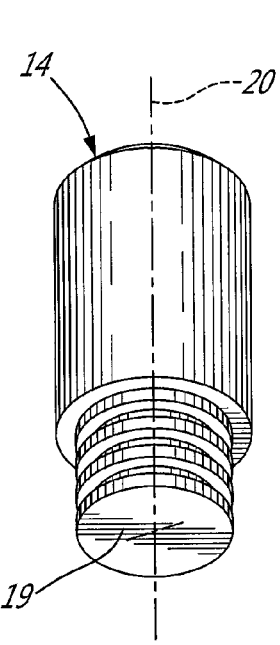
FIGS. 12 and 12a, are perspective and front views, respectively, of another variant of the component of FIGS. 10 and 10a, which uses a plurality of anchoring recesses of a generally U-shape cross-section.
Figure 12A:
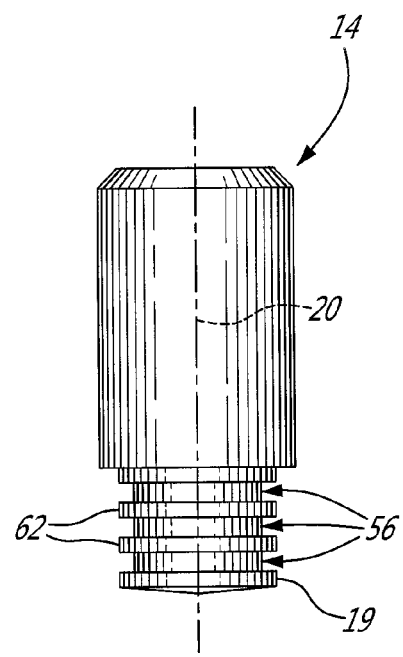

Turning now to FIGS. 12 and 12a, there is shown another variant of the component 14 as described above in view of FIGS. 10 and 10a, wherein there is a plurality of anchoring recesses 56, each being separated from another by a lateral section 62 of the component outer surface, and of a generally a U-shape cross-section as described above. By providing more than one anchoring recess, the outer component surface offer a higher shear resistant area for the material confined within the anchoring recesses after setting, which compensates for limited adherence of the first material to the second one, thereby further increasing anchoring strength. This result can be observed in view of the comparative data of Table 1, showing tensile strength measurements for components according to the designs described above in view of FIGS. 10 and 12, including force values along x,y,z axis and torque value about z axis, as well as required force for component extraction from the testing workpiece, which is indicative of tensile strength.

TABLE 1

| Design Mean value | Component Fig. 10 | Component Fig. 12 | Bolted component (M10 × 1.5) |
|---|---|---|---|
| Force- x (N) | 228.5 | 230.3 | — |
| Force-y (N) | 351.2 | 468.7 | — |
| Insertion force-z (N) | 16006.66 | 17729 | — |
| Torque-z (Nm) | 64.66 | 73.75 | — |
| Extraction force (N) | 21048.42 | 21831.049 | 20324 |

Figure 17:
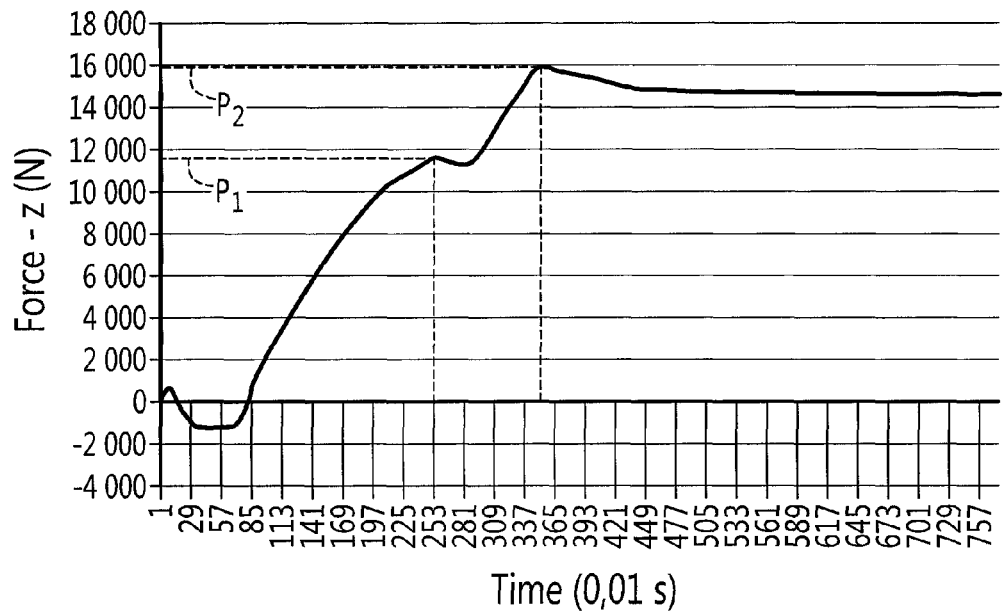
FIG. 17 is a graph representing the variation of insertion force with time as measured for the component according to the basic design of FIG. 10.

It can be appreciated that in comparison with the extraction force for a conventional bolted component of comparable dimensions, for both components 14 according to the designs shown on FIGS. 10 and 12, a significant higher extraction force was measured. This result can be explained by a pre-stress induced within the thread of the bolted component due to initial bolt tightening within the receiving threaded bore provided on the testing workpiece, which pre-stress reduced the force required for extraction. Since insertion of the tested components 14 did not induce any such pre-stress, a higher force was required to extract these components from the testing workpiece. Moreover, in view of the graph of FIG. 17 representing the variation of insertion force with time as measured for the component according to the basic design of FIG. 10, it can be appreciated that following a first peak "$p_1$" of about 11 500 N occurring at time=2.53 s, the insertion force along z axis slightly reduced at a moment where friction cause a temperature increase sufficient to plasticize aluminum and enable insertion of the penetrating end while allowing plasticized matter to fill the recess. Then, insertion force has increased to a second peak "$p_2$" of about 16 000 N at time=3.55 s, which corresponds to the moment where the expulsed material reaches the shoulder of the tool working end, to form burrs at the workpiece surface.

Figure 13:
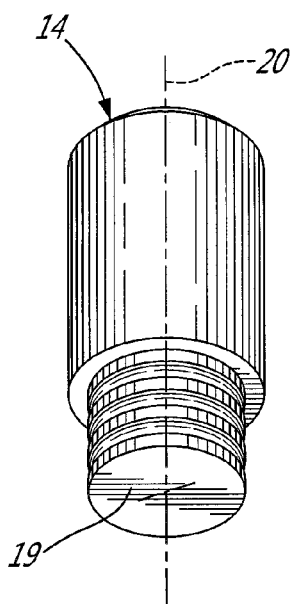
FIGS. 13 and 13a, are perspective and front views, respectively, of a further variant of the component of FIGS. 10 and 10a, which uses a plurality of anchoring recesses of rounded shape cross-section.
Figure 13A:
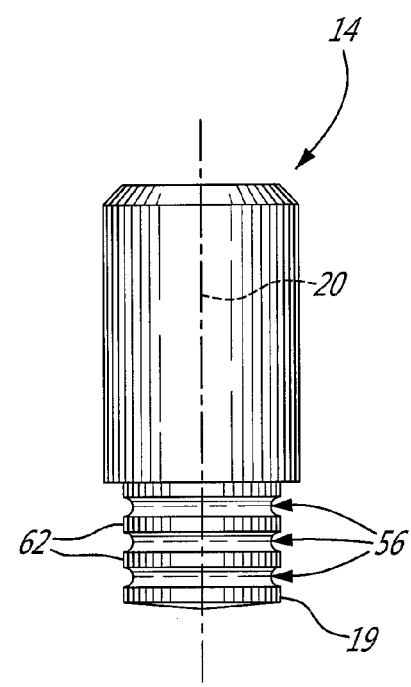

Turning now to FIGS. 13 and 13a, there is shown a further variant of the component 14 as described above in view of FIGS. 10 and 10a, wherein there is a plurality of anchoring recesses 56 of a generally rounded shape cross-section. While offering a significant volume to be filled by the plasticized material to provide anchoring strength, that shape reduces stress concentration that may cause rupture.

Referring now to FIGS. 14 and 14a, there is shown another variant of component 14 based on the design as described above in view of FIGS. 12 and 12a, using an angular insert configuration wherein each lateral section 62 of the component outer surface extends outwardly in direction of the penetrating end 19 to form in plane "P" common to insertion axis 20 an angle "α" between about 80° and 88°, and preferably between about 84° and 87°, with respect to an axis 20' perpendicular to insertion axis 20 and passing through any one of anchoring recesses 56, which are of a generally U-shape cross-section as described above.

Referring now to FIGS. 15 and 15a, there is shown another variant of component 14 based on the design as described above in view of FIGS. 13 and 13a, using an angular insert configuration wherein each said lateral section 62 forms in plane "P" an angle "α" between about 80° and 88°, and preferably between about 84° and 87°, with respect to an axis 20' perpendicular to insertion axis 20 and passing through any one of anchoring recesses 56, which are of a generally rounded shape cross-section as described above.

Turning now to FIGS. 16 and 16a, there is shown another variant of component 14 based on the design as described above in view of FIGS. 14 and 14a, wherein the component outer surface forms a plurality of anchoring recesses 56 of a generally V-shape cross-section, still offering a significant volume to be filled by the plasticized material to provide anchoring strength, while reducing stress concentration by limiting the number of sharp concave corners. Here again, while a right "α" angle may be conveniently used, an angular insert configuration is used wherein each lateral section 62 forms in plane "P" an angle "α" between about 80° and 88°, and preferably between about 84° and 87°, with respect to an axis 20' perpendicular to insertion axis 20 and passing through any one of anchoring recesses 56.

Table 2 shows tensile strength measurements for components according to the designs described above in view of FIGS. 10 and 12, including force values along x,y,z axis and torque value about z axis, as well as required force for component extraction from the test workpiece.

TABLE 2

| Design Mean value | Component Fig. 14 | Component Fig. 16 | Bolted component (M10 × 1.5) |
|---|---|---|---|
| Force-x (N) | 298 | 327.25 | — |
| Force-y (N) | 325.8 | 306.75 | — |
| Insertion force-z (N) | 13462 | 13570 | — |
| Torque- z (Nm) | 77 | 70 | — |
| Extraction Force (N) | 22000.144 | 20366.176 | 20324 |

Figure 18:
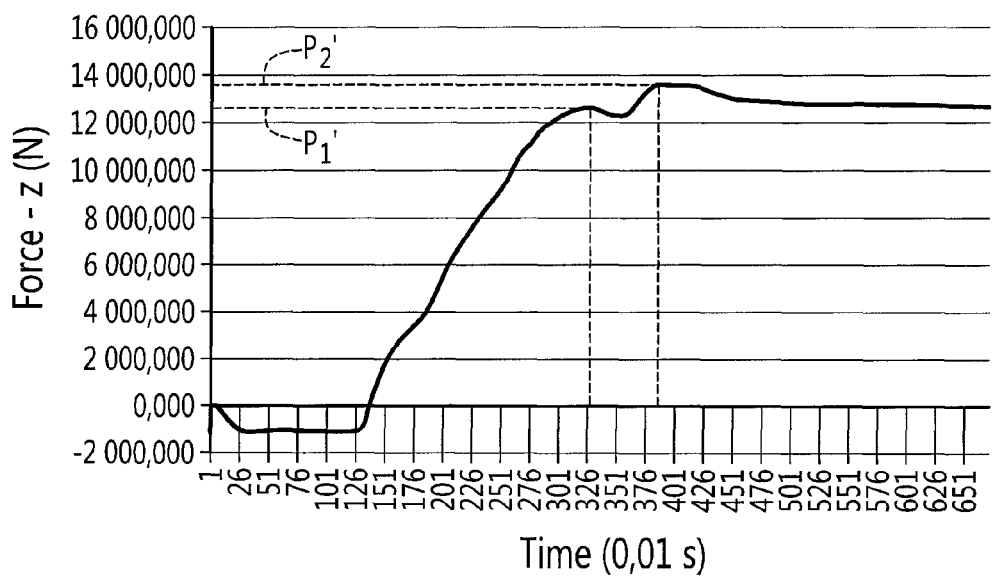
FIG. 18 is a graph representing the variation of insertion force with time as measured for the component according to the variant design of FIG. 14.

Here again, it can be appreciated that in comparison with the extraction force for a conventional bolted component of comparable dimensions, a significant higher extraction force was measured for both components 14 according to the designs shown on FIGS. 14 and 16. In comparison with the previously tested design of FIG. 12 for which the design of FIG. 14 is a variant presenting an angular insert configuration, it can be observed that the mean extraction force value obtained with the latter design was even higher than that obtained with the perpendicular configuration of the former design. Furthermore, the monitoring of component extension with applied load during the tensile strength tests with the component according to the design of FIG. 14 has shown that rupturing process is progressive, in a such way that a significant resistance force is offered by the component until complete break up and withdrawal of the component from the test workpiece. Moreover, in view of the graph of FIG. 18 representing the variation of insertion force with time as measured for the component according to the variant design of FIG. 14, it can be appreciated that after a first peak "$p'_1$" of about 12 800 N at time=3.26 s, the insertion force along z axis slightly reduced, and has then increased to a second peak "$p'_2$" of about 13 600 N at time=3.5 s, the latter peak value being advantageously even lower that second peak "$p_2$" measured with the previously tested component according to the design of FIG. 12. That result can be explained by the fact that the angular insert configuration used by the component design of FIG. 16 is characterized by a progressive reduction of overall insert diameter from the penetrating end of the component toward its opposite end, which implies a reduction of expulsed plasticized material, resulting in a corresponding decrease of insertion force along z axis.

It can be readily appreciated by the person skilled in the art of mechanical tool manufacturing that all the component designs described above in view of FIGS. 10 to 16a can be produced by any appropriate known machining technique and equipment.

The invention claimed is:

1. A rotary tool for use with a rotary driving unit for inserting a component through a surface of a workpiece made of a first material showing friction-induced plasticity to attach said component to the workpiece, said component having an insert portion extending along an insertion axis of said component, at least an outer surface of said insert portion being made of a second material harder than said first material, said tool comprising:
   a tool body adapted to be operationally coupled to the rotary driving unit and having a working end defining a shoulder portion; and
   a securing device provided on the tool body for selectively engaging the component to impart rotation thereof upon operation of the rotary driving unit in a first direction while applying an axial force of a sufficient magnitude onto the component to produce insertion of the insert portion along said axis by plasticizing the first material through friction at least until said shoulder portion is contacting said workpiece surface while maintaining said axial force during a sufficient setting time without rotation to produce said attachment;
   wherein said shoulder portion is provided with a deburring device capable of being displaced from an inoperative position upon rotation of the tool body in said first rotation direction, to an operative position whenever the tool body is caused to rotate in an opposite direction by the rotary driving unit following disengagement of the securing device with said component, to provide deburring of said workpiece surface in contact with said shoulder portion following said attachment.

2. A rotary tool according to claim 1, wherein said first material is a metallic material.

3. A rotary tool according to claim 1, wherein said deburring device includes at least one cutting element having a cutting edge and an opposite base portion received in a radially extending recess provided on said shoulder portion, the base portion being capable of being brought in full engagement with the recess upon rotation of said tool body in said first direction so that the cutting edge is maintained substantially retracted within the recess in said inoperative position, and the base portion being further capable of being brought in partial engagement with the recess upon rotation of said tool body in said opposite direction so that the cutting edge is maintained substantially projected from said recess in said operative position.

4. A rotary tool according to claim 1, wherein said working end forms a chuck provided with an aperture extending along said axis for receiving a head portion of said component, said securing device including a jaw mechanism located within said chuck at the periphery of said aperture and being selectively displaceable between a securing position and a release position.

5. A rotary tool according to claim 4, wherein said jaw mechanism is provided with threads adapted to mate with corresponding threads provided on said component head portion in said securing position.

6. A method for inserting a component through a surface of a workpiece made of a first material showing friction-induced plasticity to attach said component to the workpiece, said component including an insert portion extending along an insertion axis of said component, at least an outer surface of said insert portion being made of a second material harder than said first material, said method comprising the steps of:

i) providing a rotary tool having a body defining a shoulder portion provided with a deburring device capable of being displaced from an inoperative position upon rotation of the tool body in a first rotation direction, to an operative position whenever the tool body is caused to rotate in an opposite direction;

ii) securing the component to the tool body;

iii) rotating the rotary tool in the first direction while applying an axial force of a sufficient magnitude onto the component to produce insertion of the insert portion along said axis by plasticizing the first material through friction at least until said shoulder portion is contacting said workpiece surface;

iv) maintaining said axial force during a sufficient setting time without rotation to produce said attachment;

v) releasing the component from the tool body; and vi) rotating the rotary tool in the opposite direction to provide deburring of said workpiece surface in contact with said shoulder portion following said attachment.

7. The method according to claim 6, wherein said first material is a metallic material.

8. The method of claim 6, further comprising the step of:

vii) displacing the rotary tool away from said workpiece surface along said axis to withdraw said tool from the component.

9. The method of claim 6, wherein said component insert portion has a penetrating end and is provided with a threaded bore closed at said penetrating end and extending along said axis, said component further including a head portion having a base being secured to the tool body at said step ii) and a working end being threaded at its outer surface and engaged with said threaded bore, said method further comprising the steps of:

vii) displacing the rotary tool away from said workpiece surface along said axis to withdraw said tool from the head portion base.

10. The method of claim 6, wherein said component insert portion has a penetrating end and is provided with a threaded bore closed at said penetrating end and extending along said axis, said component further including a head portion having a base being secured to the tool body at said step ii) and a working end being threaded at its outer surface and initially engaged with said threaded bore, said method further comprising the steps of:

viii) repeating step ii); and viii) displacing the rotary tool away from said workpiece surface along said axis while rotating the rotary tool in the opposite direction to withdraw said tool while removing the head working end from the threaded bore.

11. An apparatus for inserting a component through a surface of a workpiece made of a first material showing friction-induced plasticity to attach said component to the workpiece, said component having an insert portion extending along an insertion axis of said component, at least an outer surface of said insert portion being made of a second material harder than said first material, said apparatus comprising:

a rotary driving unit;

a rotary tool having a body being operationally coupled to the rotary driving unit and having a working end defining a shoulder portion; and a securing device provided on the tool body for selectively engaging the component to impart rotation thereof upon operation of the rotary driving unit in a first direction while applying an axial force of a sufficient magnitude onto the component to produce insertion of the insert portion along said axis by plasticizing the first material through friction at least until said shoulder portion is contacting said workpiece surface while maintaining said axial force during a sufficient setting time without rotation to produce said attachment;

wherein said shoulder portion is provided with a deburring device capable of being displaced from an inoperative position upon rotation of the tool body in said first rotation direction, to an operative position whenever the tool body is caused to rotate in an opposite direction by the rotary driving unit following disengagement of the securing device with said component, to provide deburring of said workpiece surface in contact with said shoulder portion following said attachment.

12. An apparatus according to claim 11, wherein said first material is a metallic material.

13. An apparatus according to claim 11, wherein said deburring device includes at least one cutting element having a cutting edge and an opposite base portion received in a radially extending recess provided on said shoulder portion the base portion being capable of being brought in full engagement with the recess upon rotation of said tool body in said first direction so that the cutting edge is maintained substantially retracted within the recess in said inoperative position, and the base portion being further capable of being brought in partial engagement with the recess upon rotation of said tool body in said opposite direction so that the cutting edge is maintained substantially projected from said recess in said operative position.

\* \* \* \* \*